(12) United States Patent
Sia

(10) Patent No.: US 8,082,884 B2
(45) Date of Patent: Dec. 27, 2011

(54) SWIFTLETS FARMING FOR PRODUCTION OF EDIBLE BIRD'S NESTS

(76) Inventor: Yik Hei Sia, Johor Bahru (MY)

( * ) Notice: Subject to any disclaimer, the term of this patent is extended or adjusted under 35 U.S.C. 154(b) by 135 days.

(21) Appl. No.: 12/624,995

(22) Filed: Nov. 24, 2009

(65) Prior Publication Data

US 2010/0132622 A1 Jun. 3, 2010

Related U.S. Application Data

(63) Continuation of application No. 11/685,728, filed on Mar. 13, 2007, now Pat. No. 7,661,391.

(30) Foreign Application Priority Data

Mar. 13, 2006 (SG) ................................ 200601493-0

(51) Int. Cl.
*A01K 31/16* (2006.01)
*A01K 31/00* (2006.01)
(52) U.S. Cl. .................... 119/346; 119/428; 119/436
(58) Field of Classification Search .................. 119/302, 119/346, 428, 429, 427, 432–436, 449, 455, 119/456, 458, 845
See application file for complete search history.

(56) References Cited

U.S. PATENT DOCUMENTS

| | | | | |
|---|---|---|---|---|
| 1,823,584 | A | * | 9/1931 | Bruce ............................ 119/302 |
| 6,095,089 | A | * | 8/2000 | Finn .............................. 119/329 |
| 2006/0266295 | A1 | * | 11/2006 | McDarren ..................... 119/57.8 |

* cited by examiner

*Primary Examiner* — Joshua Michener
*Assistant Examiner* — Brian M O'Hara
(74) *Attorney, Agent, or Firm* — Niky Economy Syrengelas, Esq.; Crockett & Crockett, PC

(57) ABSTRACT

An edible bird's nests production facility comprising of: a wholly man made artificial caves system and/or converted natural relief such as caves, valleys, cliffs forming the nesting habitat and associated supporting facilities configured to breed swiftlets for their nests by means of a captive breeding program for swiftlets; commercialized-scientific farming methods; specialized apparatus, mechanisms and techniques; managed sustainable harvesting of nests; provision of a safe and secure nesting habitat and a conducive environment to maximize avian population by minimizing mortality rates; safe collection of nests by means of mechanized lifting systems and specialist mountaineering equipment.

2 Claims, 25 Drawing Sheets

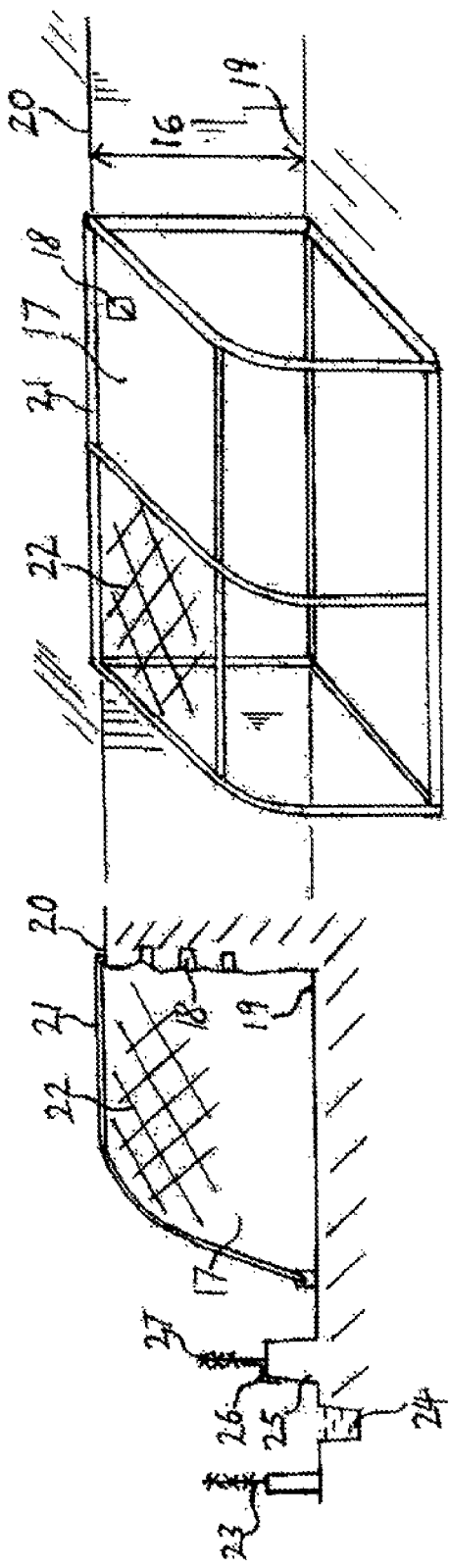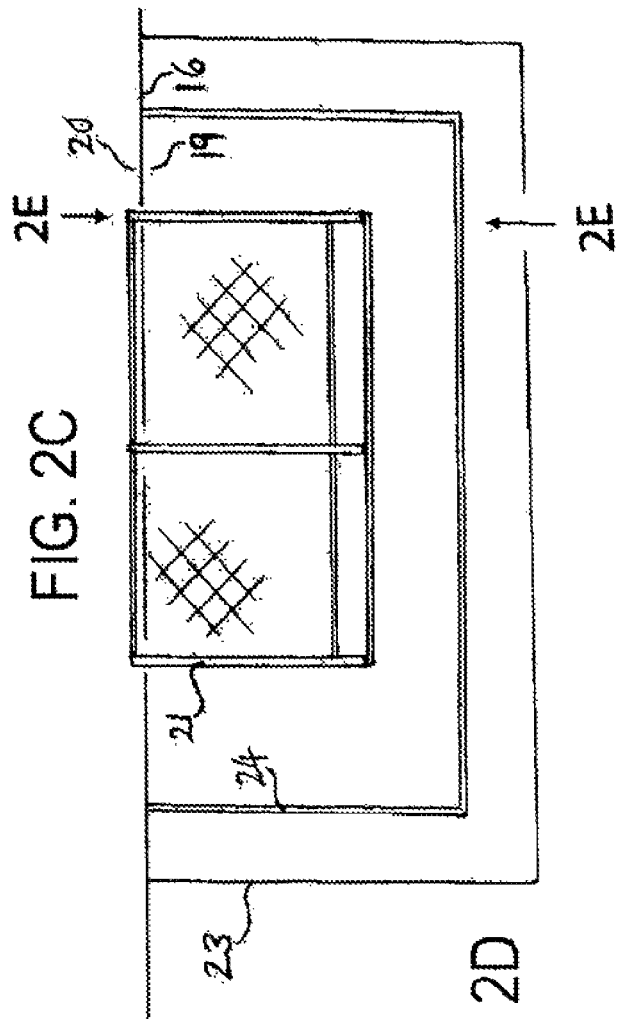
FIG. 2C
FIG. 2D
FIG. 2E

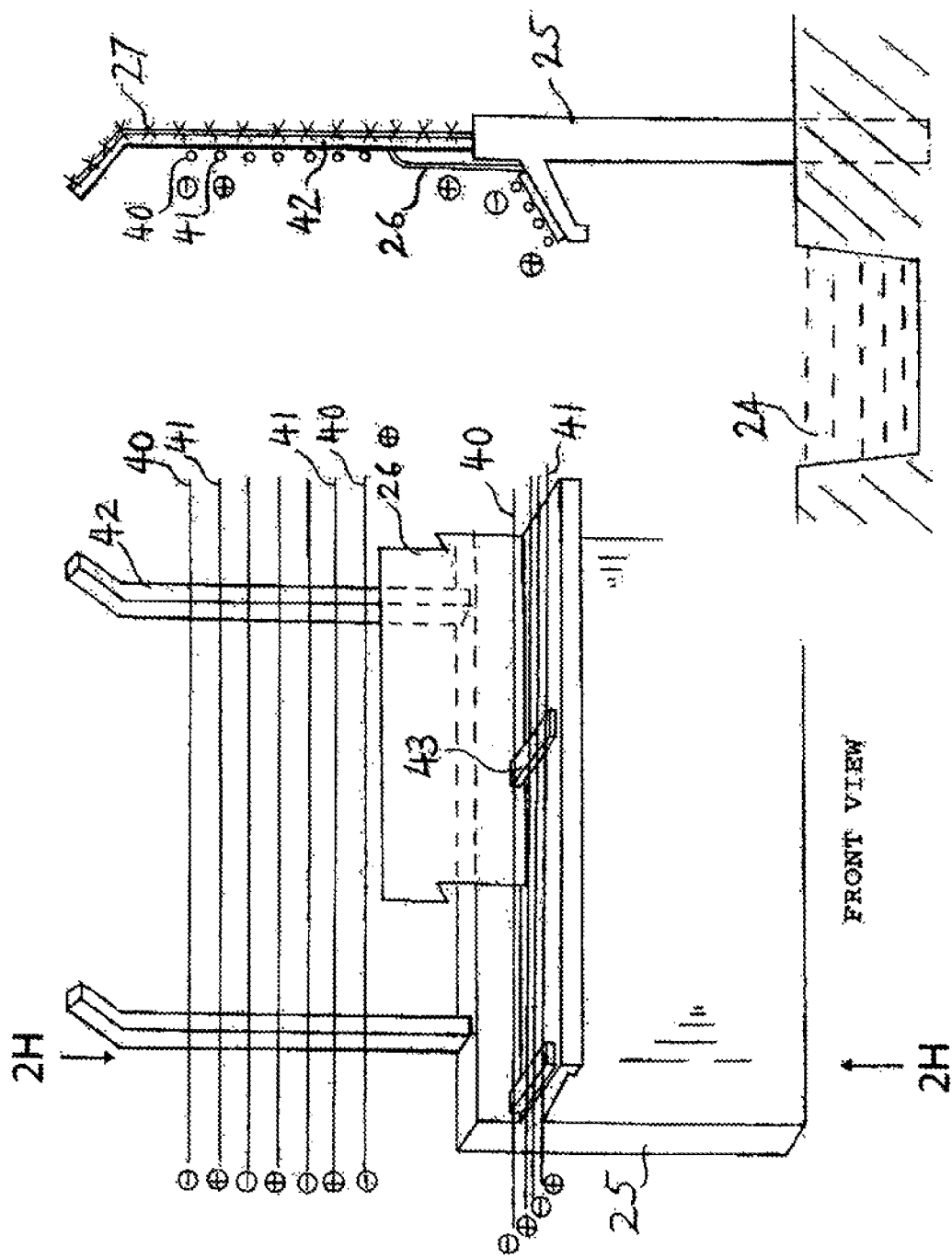

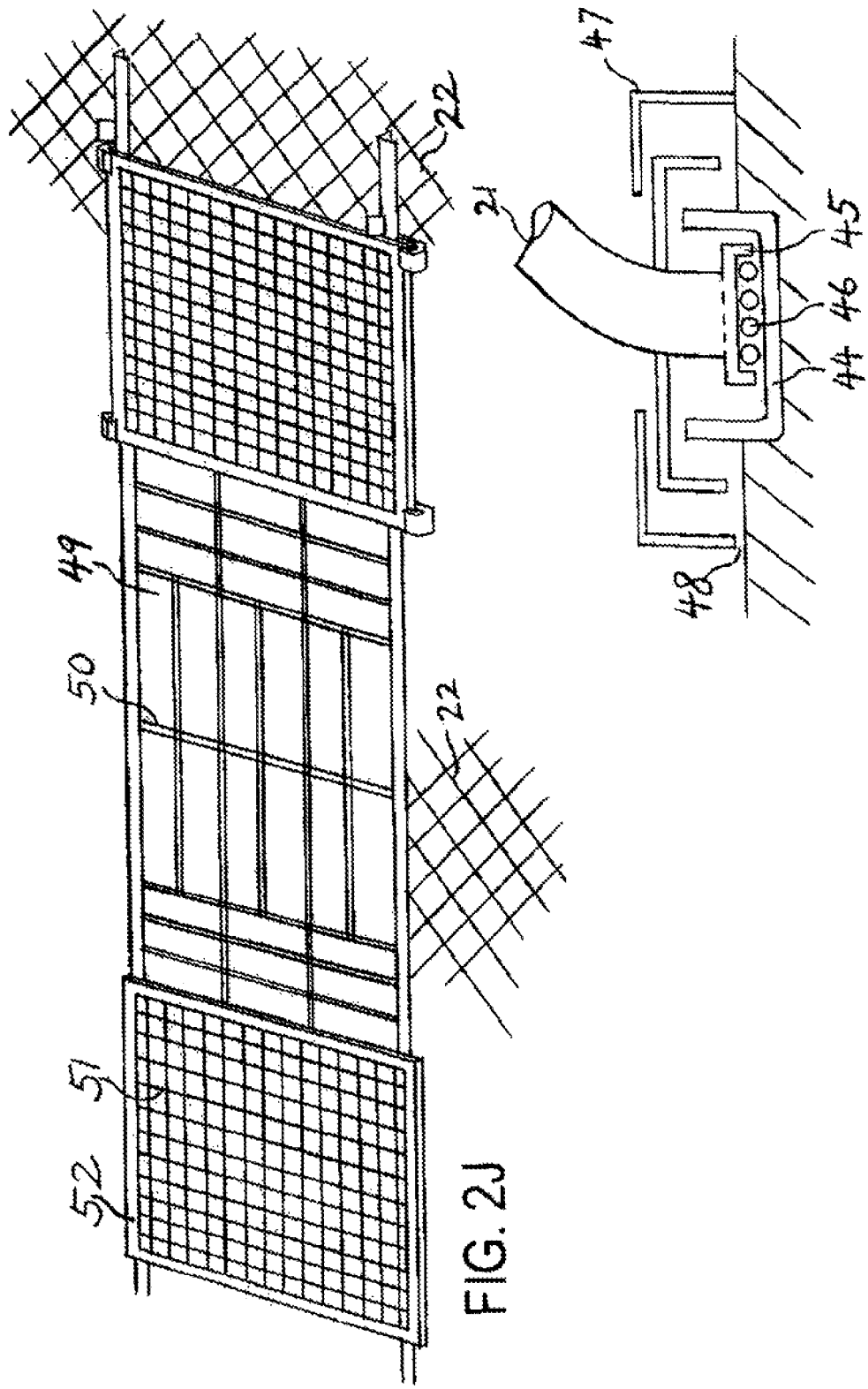

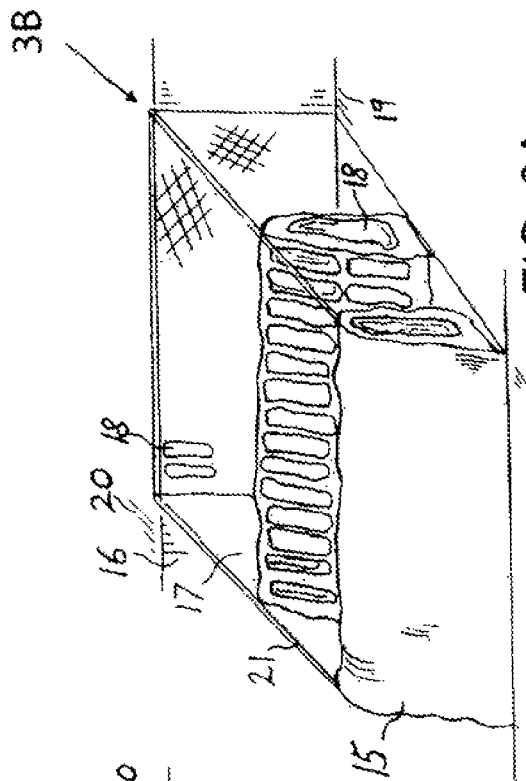
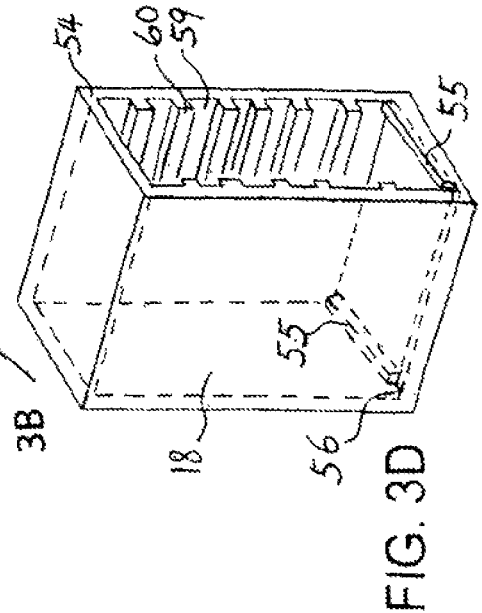
FIG. 3A
FIG. 3D
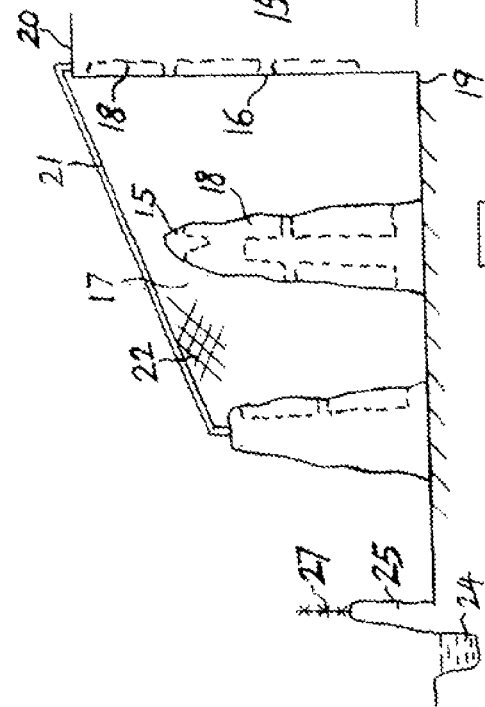
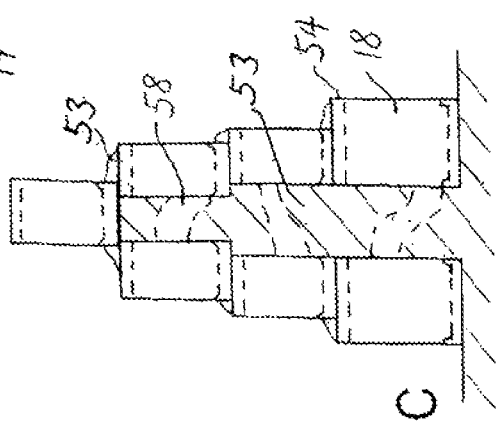
FIG. 3B
FIG. 3C

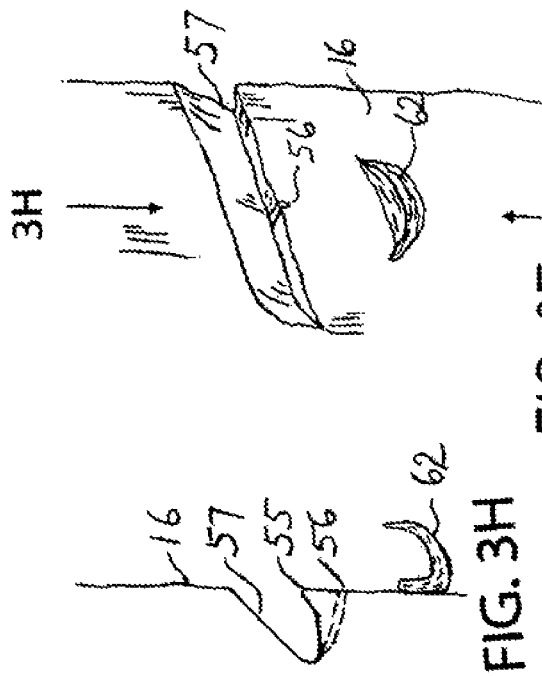
FIG. 3E
FIG. 3H
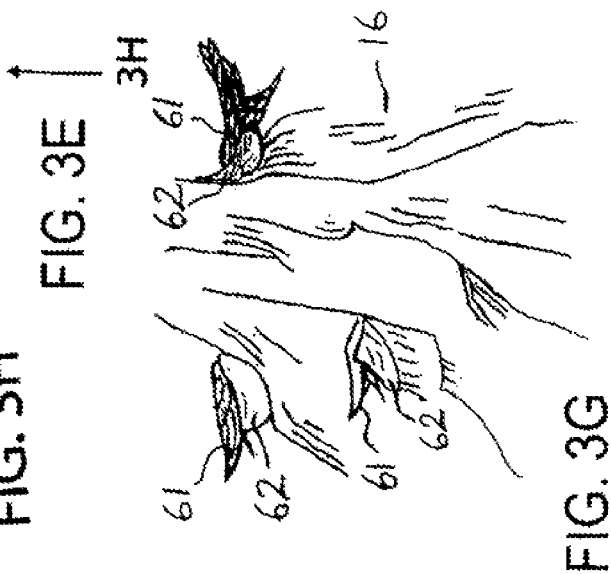
FIG. 3G
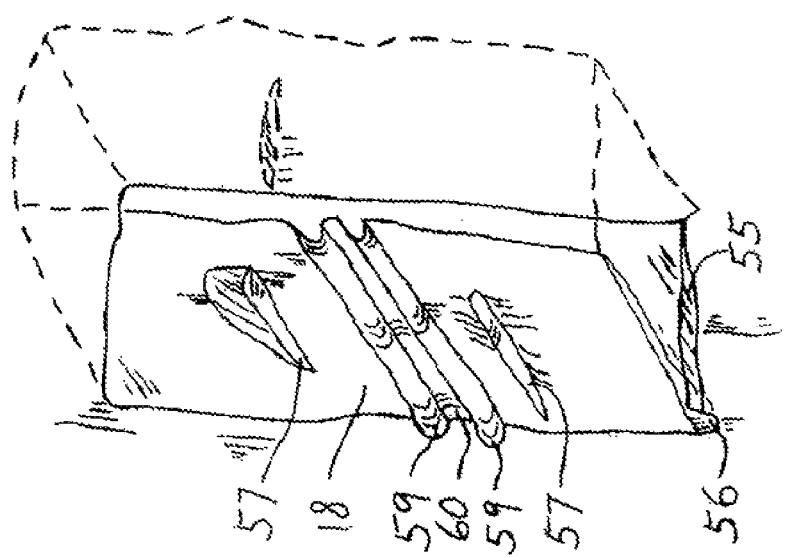
FIG. 3F

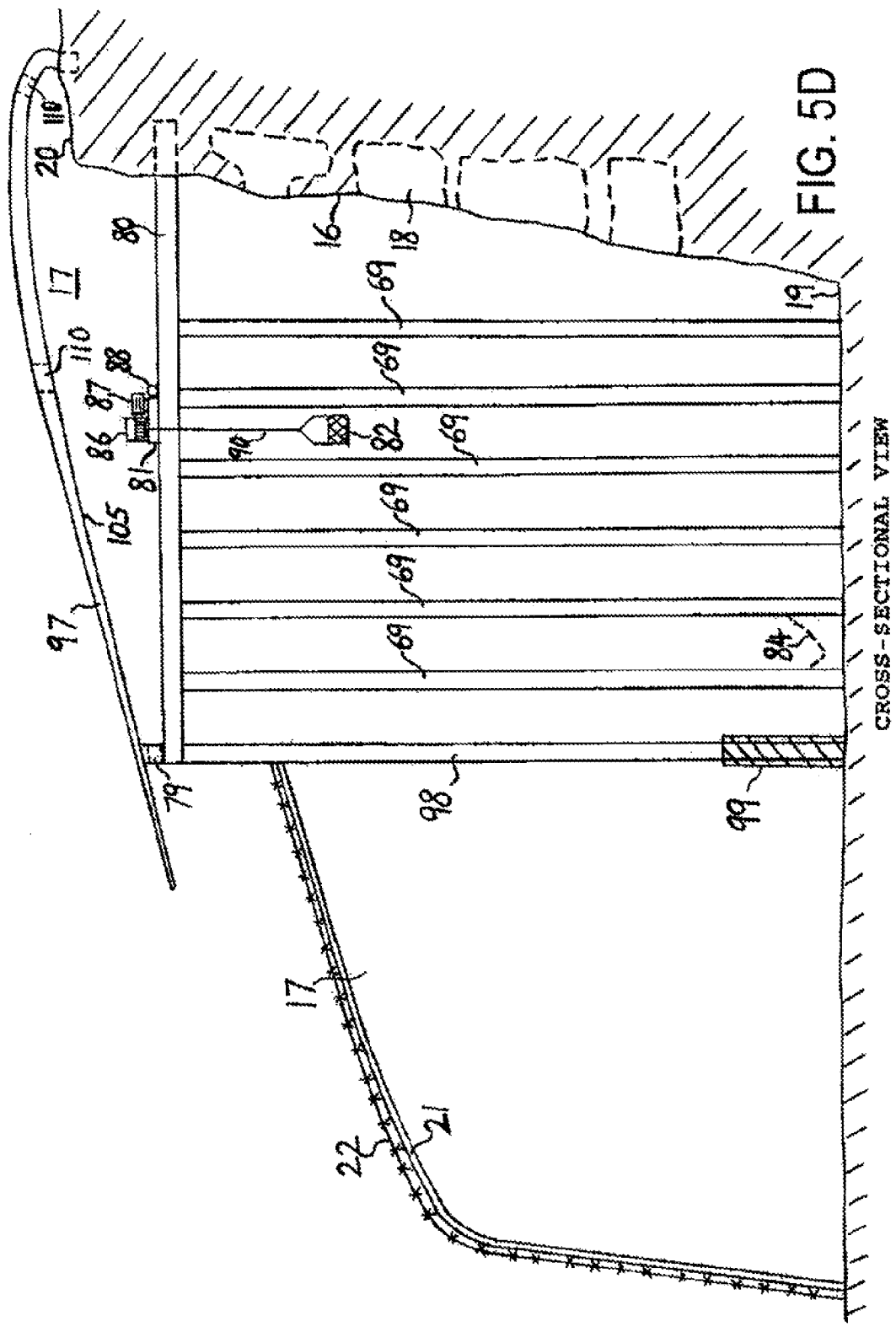

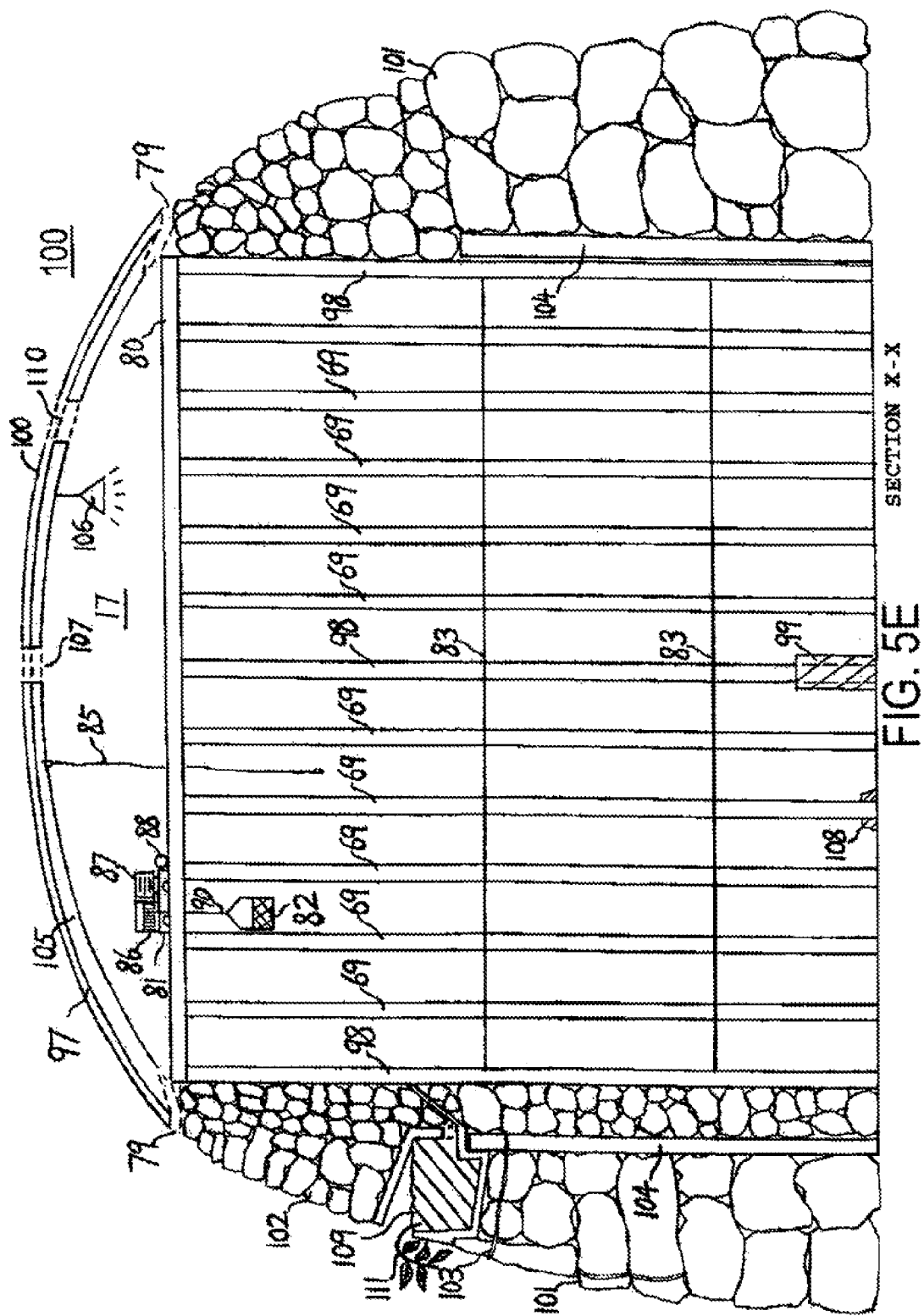
FIG. 5E SECTION X-X

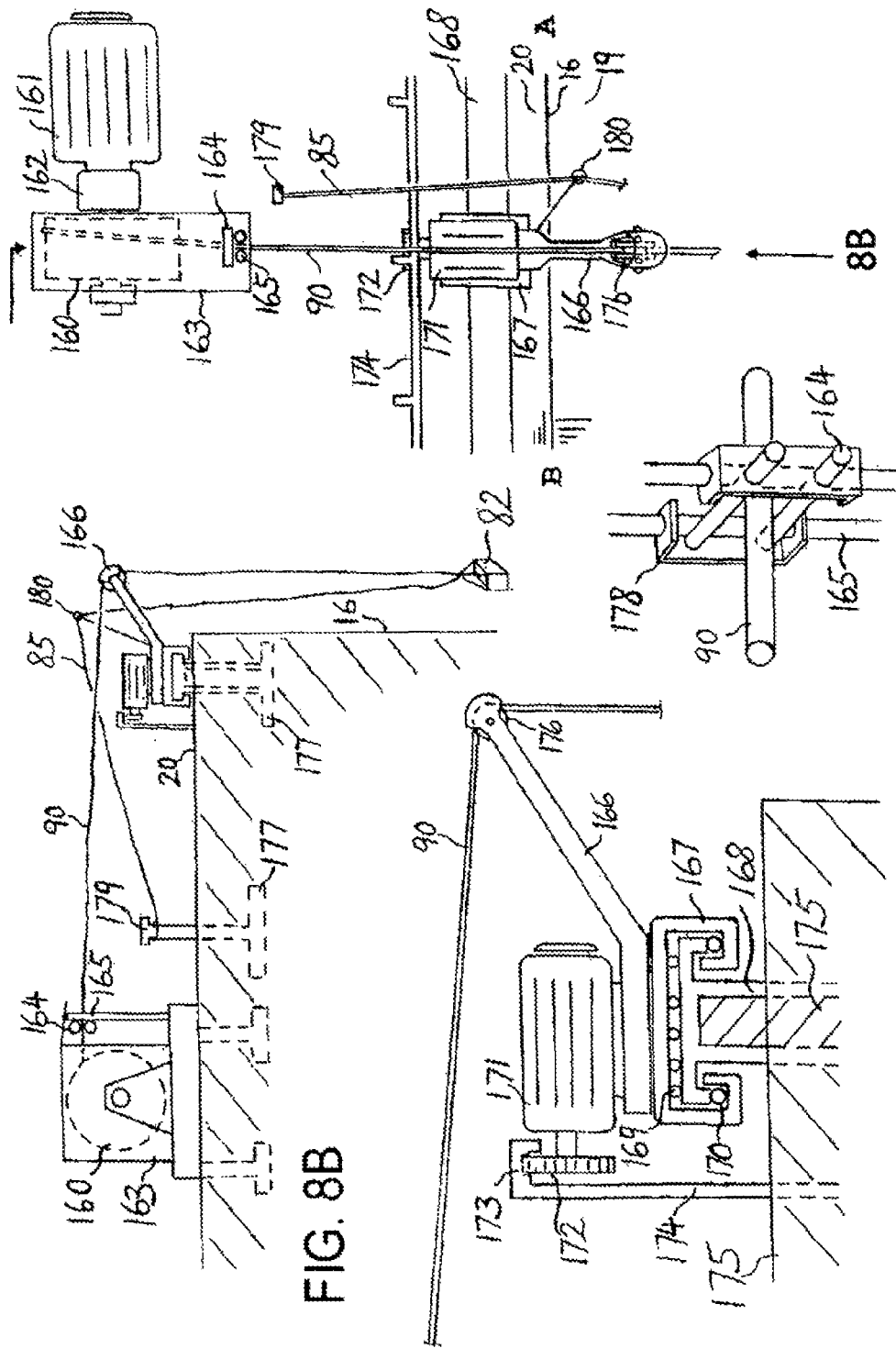

SWIFTLETS FARMING FOR PRODUCTION OF EDIBLE BIRD'S NESTS

This application is a continuation of U.S. application Ser. No. 11/685,728 filed on Mar. 13, 2007 now U.S. Pat. No. 7,661,391 which claims priority to Singapore Patent Application 200601493-0, filed Mar. 13, 2006.

FIELD OF THE INVENTIONS

The present invention relates to the breeding of swiftlets of the genus *Aerodramus* and/or *Collocalia* in an edible bird's nests production facility for producing large quantities of nests. And a highly efficient method for harvesting nests safely. Such a facility configured to breed swiftlets for their nests helps in conserving wild species of endangered swiftlets.

BACKGROUND OF THE INVENTIONS

Present method of obtaining edible bird's nest involves collecting and harvesting nests of wild swiftlets in their natural habitats such as mountain caves and limestone cliffs for consumption causing irreversible disruptions and damages to the dwindling populations of endemic wild swiftlets. Poachers have been known to raid established roosts of protected and endangered species of swiftlets in national parks and wildlife preserves at night to steal edible bird's nests. The saying, "early bird takes the worm" and "finders-keepers" epitomizes the mentality of poachers as in the wild the first to strike takes all, leaving nothing for late corners. Such that nest poachers indiscriminately destroys un-hatched eggs, killing swiftlet chicks too young to fly to safety, disrupting their reproductive life-cycle, threatening their very survival such that some species of swiftlets in South East Asia are fast approaching extinction. As with the rest of the global wildlife trade dealing in protected and endangered species of plants, animals and related wildlife products, the supply chain of the lucrative bird's nest trade is steeped in a traditional hierarchy of shadowy contacts cloaked in secrecy and black-market deals. Dealers are unable to proof the legality of their supply sources. Unscrupulous dealers have been known to pass off imitation products and fakes as genuine edible bird's nests. Some nest-processors employed harmful chemicals and detergents in the treatment of nests to improve the market value of the commodity to the detriment of consumers.

The birds called Cave Swiftlets or Swiftlets are contained within the four genera of *Aerodramus* (formerly *Collocalia*), *Hydrochous*, *Collocalia* and *Schoutedenapus*. They form the collocaliini tribe within the family Apodidae. Geographically the genus *Aerodramus* comprises around 30 species with a habitat range covering southern Asia, south pacific islands and north eastern Australia located within the tropical and sub-tropical regions. Edible bird's nests are derived from cave swiftlets of the genus *Aerodramus* and/or *Collocalia*. In particular four species comprising *A. unicolor, A. fuciphagus, A. maximus* and *A. germani* are the most prized. *A. unicolor* and *A. fuciphagus* (also known as *Collocalia fuciphaga*) produces high grade white nests while *A. maximus* produces lower grade black nests containing more feathers, particles and other impurities.

Scientific classification of these avian species being:
Kingdom: Animalia
Phylum: Chordata
Class: Ayes
Order: Apodiformes
Family: Apodidae
Genus: *Aerodramus*
Species: *A. unicolor, A. fuciphagus, A. maximus* and *A. germani*
Binominal name: *Aerodramus unicolor, Aerodramus fuciphagus, Aerodramus maximus* and *Aerodramus germani*
Common name: Indian Swiftlet, Edible-nest Swiftlet, Black-nest Swiftlet and German's Swiftlet The Collacaliini tribe of swiftlets comprises the: Edible-nest Swiftlet (*Aerodramus fuciphagus*); Indian Swiftlet (*A. unicolor*); Black-nest Swiftlet (*A. maximus*); German's Swiftlet (*A. germani*); Waterfall Swift (*Hydrochous gigas*); Glossy Swiftlet (*Collocalia esculenta*); Cave Swiftlet (*C. linchi*); Pygmy Swiftlet (*C. troglodytes*); Seychelles Swiftlet (*A. elaphrus*); Mascarene Swiftlet (*A. francicus*); Philippine Swiftlet (*A. meamsi*); Moluccan Swiftlet (*A. infuscatus*); Mountain Swiftlet (*A. hirundinaceus*); White-rumped Swiftlet (*A. spodiopygius*); Australian Swiftlet (*A. terraereginae*); Himalayan Swiftlet (*A. brevirostris*); Indo-chinese Swiftlet (*A. rogersi*); Volcano Swiftlet (*A. vulcanorum*); Whitehead's Swiftlet (*A. whiteheadi*); Bare-legged Swiftlet (*A. nuditarsus*); Mayr's Swiftlet (*A. orientalis*); Palawan Swiftlet (*A. palawanensis*); Mossy-nest Swiftlet (*A. salangana*); Uniform Swiftlet (*A. vanikorensis*); Palau Swiftlet (*A. pelewensis*); Guam Swiftlet (*A. bartschi*); Caroline Islands Swiftlet (*A. inquietus*); Atiu Swiftlet (*A. sawtelli*); Polynesian Swiftlet (*A. leucophaeus*); Marquesan Swiftlet (*A. ocistus*); Papuan Swiftlet (*A. papuensis*); Scarce Swift (*Schoutednapus myoptilus*); Schouteden's Swift (*S. schoutendeni*).

Swiftlets lives in flocks along tropical coastal areas and are aerial insectivores. The average body length of a swiftlet is 9 centimeters, about half the size of a swallow. Swiftlets have a shorter rectangular tail while swallows have a longer forked tail. The *A. unicolor* measuring around 12 centimeters in length is mainly dark brown above and paler brown below. *A. fuciphagus* is smaller measuring 9 centimeters in length and weighs about 15 to 18 grams with a band of brownish gray feathers across the rump. *A. maximus* is larger with a wing-span of 13 centimeters and weighs 28 grams. Its lower legs have a row of small feathers.

Most swiftlets have a characteristic shape with a short tail and very long swept-back wings resembling a crescent or a boomerang for fast flight with a wide gape and small reduced beak surrounded by bristles for catching insects in flight. The flight of some species is characterized by a distinctive "flicking" action. Swiftlets roosts on vertical cliffs or walls of caves high above, making harvesting of nests an extremely risky profession. Many collectors were known to have fallen to their death from flimsily constructed climbing apparatus used for harvesting edible bird's nests. Swiftlets have sharp claws protruding forward for clinging securely onto vertical cliffs and well developed salivary glands which are able to secrete large amounts of saliva which solidifies in contact with air, forming the main agent in the building of their nests. Swiftlets builds their nests three times a year, not for the purpose of habitation but to foster their young. Nests are attached to the rocky walls of humid limestone caves. Adult swiftlets would rest and sleep while perched vertically on cave walls, supporting their bodies with sharp claws. Each nest is only used once and is abandoned once young swiftlets have learnt to fly.

The average life span of a swiftlet is about 15 to 18 years. During the breeding season, all the species' salivary glands expand to produce the special sticky saliva for binding twigs and other detritus together for building the nest, in particular male swiftlets which uses thick saliva to construct the white shiny nest. The saliva is produced by a pair of lobed salivary glands beneath the tongue of parent birds. It is also called nest-cement. This glutinous nest-cement dries fast in contact with air. The nest is a shallow half-moon cup stuck to the vertical cave wall into which eggs are laid. *A. fuciphagus* and *A. unicolor* each lays a clutch of 2 eggs. The eggs are incubated for around 3 weeks before hatching. Young fledgling leaves the nest in 2 weeks but remains near it, clinging to the cavity for another 2 weeks without flying.

A pair of *A. maximus* takes an average of 30 days to lay one egg and 25 days to incubate the egg. The chicks needs at least 45 days to grow large enough to fly and takes 4 months for juvenile birds to mature. The breeding cycle of Black-nest swiftlets from its ability to fly to building its own nest is about one year. Residing mainly in the Niah Caves and Mulu Caves in Borneo, *A. maximus* has three breeding seasons in one year. Avian census by Banks in 1935 recorded 1.7 million nests in the Niah Caves compared to 65,000 nests in a DANIDA/SWMPI census in 2002, a decrease of 96%. Source: DANIDA/SWMPI (Danish International Development Assistance/Support to Wildlife Master Plan Implementation) project; and Sarawak Forest Department, Malaysia.

Historically, ever since the voyages of Chinese Admiral Zheng He (Cheng Ho) to the "southern seas" (South China Sea) 700 years ago; and the establishment of barter trading of Ming Dynasty Chinese ceramics, porcelain wares, silk, exquisite handicrafts, etc. in exchange for tropical products such as edible bird's nests, spices, pepper, camphor, sandalwoods, rottan, belian (iron wood), etc. Edible bird's nests from the island of Borneo in particular the Niah Caves, had been closely associated with the imperial court, royalty and the Emperor of China. Consumption of edible bird's nests in China dates back 1,000 years ago and had been ingrained into the psyche of the orient as a special food fit for kings. Gifts and presents made of edible bird's nests in family gatherings to celebrate auspicious occasions and festive seasons had become a fashionable trend in Asia. Such that demand for this scarce commodity out-strips supply, which conversely, had been shrinking due to poaching, non-sustainable harvesting and destruction of wild habitats.

Scientifically and medicinal wise, demand for this commodity may be explained by the close relationship of edible bird's nests with the enzyme neuraminidase. In U.S. Pat. No. 4,071,408 Flashner et al teaches a method of extracting extracellular neuraminidase from a micro-organism *Arthobacter sialophilum* sp. *nov.* found in edible bird's nests, regurgitated by the swiftlets *Collocalia*. This enzyme is used for treatment or regression of solid tumors and useful in immunological and birth control investigation and application.

Domestication, commercialized breeding, rearing and managed husbandry of swiftlets in a specially equipped highly productive avian farm or edible bird's nest production facility dedicated to producing edible bird's nest on a commercial scale will prevent extinction and enhance the survival of wild avian species by providing an alternative supply of farmed edible bird's nests in the market, reducing and stabilizing prices of the commodity making illegal harvesting of wild nests unattractive to poachers.

The relatively tasteless nests are harvested and prepared for cuisine in soup mixed with chicken, spices, and other flavors as an oriental gastronomic delight with supposed aphrodisiac properties. Only a few species are suitable and it is those species whose nests are made purely or almost purely of saliva that are most prized and sought after, especially the genus *Aerodramus* and/or *Collocalia*. In particular the species *A. fuciphagus*, *A. unicolor*, *A. maximus* and *A. germani*.

Captive breeding programs for animals including birds and fish have brought back many species from the brink of extinction and restored wild populations. Such a program may be used to establish a colony of swiftlets in a newly constructed production facility, or a new extension of an existing production facility, or restore wild populations.

SUMMARY

To this end the present invention provides a method to breed and domesticate swiftlets in an edible bird's nest production facility comprising of: a wholly man made artificial caves system and/or converted natural relief such as caves, valleys, cliffs forming the nesting habitat; and associated supporting sub-facilities; specialized equipment and apparatus. A dedicated facility specially configured for the commercial production of edible bird's nest including persuasive inducement of providing shelter and/or food for wild swiftlets, obtaining fertilized eggs for captive breeding, hatching, caring for the hatchlings and young chicks, rearing, developing familiarity and bonding of the hatchlings with human handlers.

The nesting habitat comprises the main facility in the farm while other related sub-facilities includes the incubation facility for hatching eggs; "wormery" a large scale worms breeding and production facility for providing bird feed; greenhouses for bringing up swiftlet chicks; transitional facility for acclimatizing the hatchlings; nests processing facility; sago (*Metroxylon* spp.) log ponds for breeding and producing sago worms, a larvae of the *Rhynchophorus* spp. beetles as bird feed; escape cages; large scale insect traps; mechanized lifting systems, etc.

In an extension of the captive breeding program, hatchlings two to four weeks old (before fledging) may be obtained from semi-domesticated swiftlets residing in abandoned buildings and vacant human dwellings. The hatchlings may be manually collected from such shelters and transferred to another location or new extensions of the present facility to initiate the breeding of a new colony of swiftlets.

Present invention also discloses a method of providing a manipulated breeding environment conducive to the birds, including special training techniques such as pre-mediated conditioning and acclimatization of hatchlings to its nesting colony, bonding with its brood and avian community creating a conscious and sub-conscious feeling of belonging to its "home-ground" and habitat. Such that even after it has grown up, and may be allowed to fly free to forage for natural foods, the domesticated bird returns daily to roost at its breeding ground, congregate and interact in an avian colony which it recognizes as its own, a "home-ground" and safe haven to which it belongs.

Such that when the nesting season approach, this innate sense of belonging and pre-mediated conditioning ingrained into the conscious and sub-conscious mind urges nesting swiftlets to return home to its colony and birth-place to roost, congregate, mate, build new nests, lay eggs, brood, hatch and rear the next generation of young. Special survival techniques and live training exercises may be provided to juvenile birds in a controlled environment to help them survive better when foraging for food in the vicinity of the avian farm.

An object of the present invention is to provide a method and system including facilities and techniques for the large scale domestication, breeding and rearing of swiftlets for their nests, commercial production techniques, managed sustainable harvesting and safe collection of edible bird's nests to satisfy the appetite of connoisseurs and to meet market demand without harming wildlife. A scientific method of farming including the provision of apparatus and techniques beneficial to avian husbandry and the conservation of wild swiftlets capable of producing edible bird's nests. Scarcity of supply relative to global demand serves to artificially inflate the high prices of this "delicacy." It is a fact that edible bird's nests comprises an essential ingredient in Asian culinary delights and "traditional medicine" practices, a tonic and an invigorating health food for the rich and affluent to pep up their energy levels.

The method as disclosed may create a new niche or spin-off industry in animal husbandry for high volume production of edible bird's nests in commercial farms comprising specialized production facilities. Providing the traditional edible bird's nest industry steeped in harvesting of wild nests with an alternative supply of commercially farmed edible bird's nests. A cleaner, healthier and high quality source of health food product produced in a controlled environment by means of modern scientific farming techniques. Commercial farming possess advantages such as economics of scale, high productivity and efficiency; safe breeding environment for swiftlets and safe harvesting of edible bird's nests by collectors trained in the use of mountaineering equipment and mechanized lifting systems; including other specialized equipment, facilities and techniques designed, configured and tailor made for the edible bird's nest production facility; modern management techniques, deployment of professional expertise such as veterinarians and ornithologists, avian medications, vaccination against disease and sickness, etc. Favorable conditions that only a farm environment can provide. Such advantages may be used to maximize the avian population by minimizing mortality rates, thus increasing productivity and efficiency of the production facility. Farmed edible bird's nest provides connoisseurs with a choice of consuming such nests with a clear conscience, secure in the knowledge that they had not harmed wild-life. But had in fact, helped in the conservation of wild species of swiftlets by making a conscious personal choice in choosing farmed products, in preference, over wild life related products.

Included in the swiftlet's breeding and edible bird's nests production facility of present invention are specialized equipment such as predator traps; arrangement to exclude or keep out predators from the nesting habitat; commercial breeding and production facilities for worms, gigantic enveloping cages protecting the roosting habitat; adaptation, modification and integration of nesting habitat into natural formations like rock cliffs and mountain valleys forming ecologically and environmentally friendly avian eco-farms; artificial nesting cavities built into natural cliffs; man made roosting structures and cavities, wholly man made artificial "caves" for breeding swiftlets; nesting panels specifically designed for swiftlets to perch vertically and to build nests during the breeding season; designs incorporating safety features into the constructions, apparatus and safety devices to minimize fledgling mortality rates; pest control measures including fumigation with chlorine gas and cleaning of nesting panels with high pressure water jets; mechanized lifting systems, safety equipment and apparatus for safely collecting and harvesting edible bird's nests from great heights, hundreds of meters above ground level.

Present invention is conducive to the conservation and beneficial to the preservation of endangered species of swiftlets, to bring them back from the brink of extinction and eventual removal from the list of endangered species. The production facility, methods, apparatus and techniques as disclosed may be used to make available a constant supply of cheap and affordable edible bird's nest for consumers. Such that edible bird's nest may no longer remain as a rare commodity affordable to the rich and affluent but commonly available for all connoisseurs.

BRIEF DESCRIPTION OF THE DRAWINGS

Preferred embodiments of the present invention will now be described with reference to the accompanying drawings wherein:—

FIG. 2C shows a cage constructed adjacent to a naturally occurring rock cliff in the form of a gigantic semi-dome structure. The natural cliff modified and constructed with crevices, caves and foot holds to form a nesting habitat and an edible bird's nest production facility for breeding swiftlets.

FIG. 2D shows a plan view of the protective cage structure.

FIG. 2E shows a cross-sectional view 2E-2E of the protective cage structure, nesting crevices and predator traps.

FIG. 2G shows the detailed layout of the predator traps comprising a moat, bunds, flat metal piece, fence, and electrified wire grids to keep out unwanted intruders.

FIG. 2H shows a cross sectional view 2H-2H of FIG. 2G.

FIG. 2I shows a cross sectional view of the base of girders resting on an arrangement of plates and rollers to cater for thermal expansion and earthquake tremors.

FIG. 2J shows the grill arrangement of access-ways of the protective cage structure to filter out airborne predators and birds of prey.

FIG. 3A shows the arrangement of a man made nesting structure made of hardened earth, rocks and mortar to form a small hill with double sided cliffs complete with nesting caves.

FIG. 3B shows a cross sectional view 3B-3B of FIG. 3A.

FIG. 3C shows a man made hill comprising rocks and/or blocks of hardened earth or clay bricks arranged to form a nesting structure for breeding swiftlets.

FIG. 3D shows detailed features of an individual block of hollow brick used in building the nesting structure of FIG. 3C.

FIG. 3E shows a grove excavated into a rock cliff built with a drain and a raised edge at the lip. Section 3H-3H provides a detailed cross-sectional view.

FIG. 3F shows details of a manually excavated cave built with a drain and a raised edge. The walls are serrated with indentations and protrusions purposely made using drills.

FIG. 3G shows swiftlets nesting in their nests built on small toe-holds of protrusions and indentations in a natural cave wall or cliff face.

FIG. 3H shows a cross-sectional view 3H-3H of FIG. 3E.

FIG. 5D shows the modification of a single sided cliff face and valley as illustrated in FIG. 2C, 2D, 2E into a high density populated facility for breeding swiftlets and a highly productive edible bird's nest production facility.

FIG. 5E shows a cross sectional view 5E-5E of FIG. 5F and details of the structural configuration of a wholly man made artificial roosting habitat built to resemble, emulate and simulate naturally occurring cave like breeding conditions.

FIG. 8A shows the plan view of a hoisting and winching apparatus used to harvest or collect edible bird's nests from caves built into a mountain cliff.

FIG. 8B shows a cross sectional view 8B-8B of the main winching and hoisting apparatus as shown in FIG. 8A used to provide vertical lift for harvesting edible bird's nest.

FIG. 8C shows the detailed sectional view 8B-8B of one part of the winching apparatus comprising the motorized pulley mechanism capable of moving a nest collector horizontally between point A and point B along the steep cliff face 16.xx FIG. 8D shows a detailed view of guide rollers used to keep the hoist line in position, and prevents abrasion against the housing assembly.

DETAILED DESCRIPTION OF THE INVENTIONS

Figure 1B:
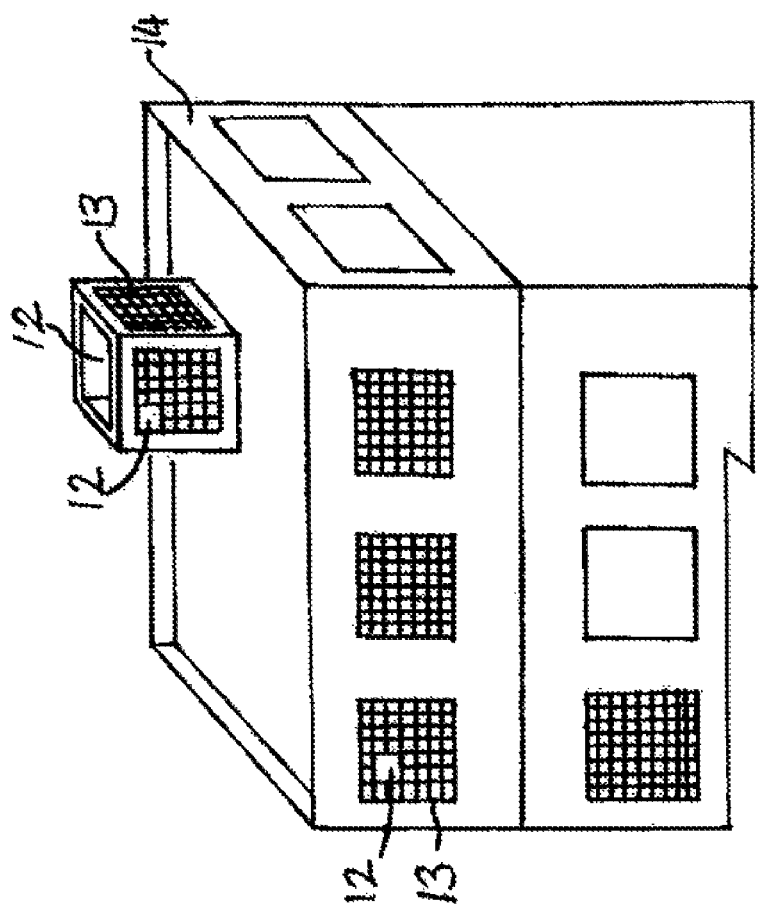
FIG. 1B shows an alternative nesting site in vacant man made buildings converted/or built for breeding swiftlets.
Figure 1A:
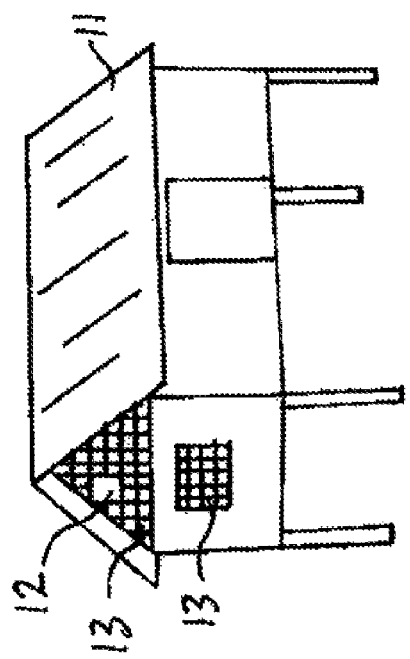
FIG. 1A shows a method for the semi-domestication of wild swiftlets in abandoned or unoccupied human dwellings, houses and premises adapted for rearing swiftlets.

FIG. 1A and FIG. 1B shows one embodiment of present invention for the semi-domestication of wild swiftlets and small scale production of edible bird's nest. This may be achieved and enabled through the provision of shelters, roosting habitat or a nesting site including food and water to establish a colony of the nesting birds. Wild swiftlets may be attracted to the vacant habitat comprising man made structures by means of recorded playback of bird calls broadcast over audio systems repeatedly until a small colony of birds had been established naturally. Nesting habitat may comprise isolated crevices in the attics of houses and vacant human dwellings 11 and unoccupied commercial buildings 14 specially adapted to provide a man made environment conducive to attract wild swiftlets to build their nests. Such that doors and windows may be shuttered, boarded or bricked up and cemented. Building 14 may be specially designed, configured and built for breeding swiftlets. Nesting panels constructed from wood, plywood, silicates and carbonates building materials may be placed inside these man-made shelters, buildings and structures to increase nesting surface areas and to provide vertical perches for resting birds. Entrance to the shelters may comprise of small size apertures 12 to discourage predators. Alternatively entrance 12 may be guarded by grills 13 adequately spaced for swiftlets to enter and exit.

Swiftlets being nesting creatures by nature normally returns to its established nesting habitat to breed during the breeding season year after year. Nests produced by such semi-domesticated swiftlets may be collected once the juvenile bird had abandoned and left its nest to fly free. Collected nests are normally sold raw to be further processed for food. Nests built by the wrong kinds of birds (e.g. swallows or sparrows) may be removed together with the eggs, such that over time this manual selection process only leaves behind a colony of swiftlets that produce the right kind of nests for the trade. Such a method may be used to generate a cottage industry for the semi-domestication of swiftlets and the small scale production of edible bird's nest.

In another embodiment of present invention eggs laid by swiftlets during the nesting season in such shelters 11 and 14 may be partially collected and removed for captive breeding in an edible bird's nest production facility such as the wholly man made artificial cave structure 100 as disclosed in present invention, specially designed and configured for breeding millions of swiftlets for the commercial production of tons of edible bird's nests. Alternatively, eggs for captive breeding may also be obtained from the nests of wild swiftlets.

In an extension of the captive breeding program, besides eggs, chicks, hatchlings and juvenile swiftlets 2 to 4 weeks old (before fledging) may also be obtained from semi-domesticated swiftlets residing in such shelters. The juveniles may be manually collected from these shelters and transferred to colonize a newly established large scale production facility; or, to newly extended portions of the existing production facility. Such a method also helps to relief population pressure of existing shelters through a managed re-distribution of the avian demography, and to avoid an avian population explosion. Such an overcrowding of habitat may be detrimental to the swiftlets breeding cum edible bird's nest production facility. In human terms, such a demographic re-distribution may be equivalent to the concept of resettlement or relocation.

FIG. 2A to FIG. 8H shows the main embodiment of present invention including a method, system, apparatus, equipment and techniques for the domestication and breeding of swiftlets for the production of edible bird's nests in a highly productive and efficient production facility comprising artificial man-made nesting structures or converted natural relief capable of producing hundreds of tons of edible bird's nests annually.

FIG. 2A to FIG. 2I illustrates a method of integrating man made structures with mother-nature such that the roosting habitat may be built, integrated and blended into mountain cliffs or other naturally occurring structures such as mountain caves, limestone cliffs, ledges and overhanging rocks. Such that like naturally occurring structures may be modified, adapted and adopted to provide a conducive nesting site and habitat for breeding swiftlets for the purpose of obtaining their nests for human consumption. Such a method of integrating and blending man made facilities into a natural setting being the basis for the establishment of an "eco-farm," an environmentally and ecologically friendly method for breeding swiftlets for the production of edible bird's nests conducive to the conservation of wild swiftlets. Such that eggs sourced and obtained from semi-domesticated birds in FIG. 1 or, from the wild may be transferred to a wholly man made artificial cave structure 100 and habitat 17 for breeding. The eggs may be incubated in incubator 30. Artificially hatched chicks from incubator 30 and naturally hatched chicks obtained from semi-domesticated birds in shelters 11 and 14 may be raised in green houses 33 of the specialized avian eco-farm for the full domestication of swiftlets by means of such a captive breeding program.

The domesticated avian population forms a ready pool of genetic stock (a living gene bank) for re-populating the wild or re-establishing wild flocks of birds whenever necessary. In particular the endangered species comprising: *Aerodramus fuciphagus, A. unicolor, A. maximus* and *A. germani*.

Figure 2A:
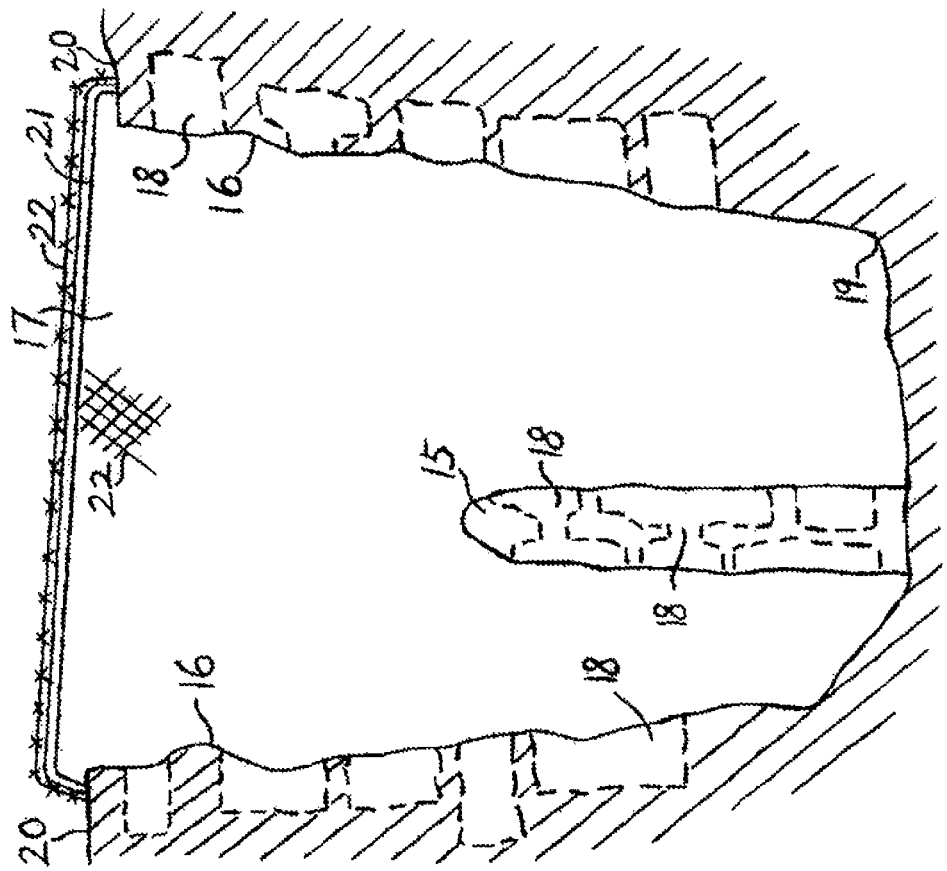
FIG. 2A shows the cross-sectional view of the adaptation and conversion of two naturally occurring cliffs and a U-shaped valley lying in between two mountains into a roosting habitat covered with an enveloping cage on top and at the flanks.
Figure 2B:
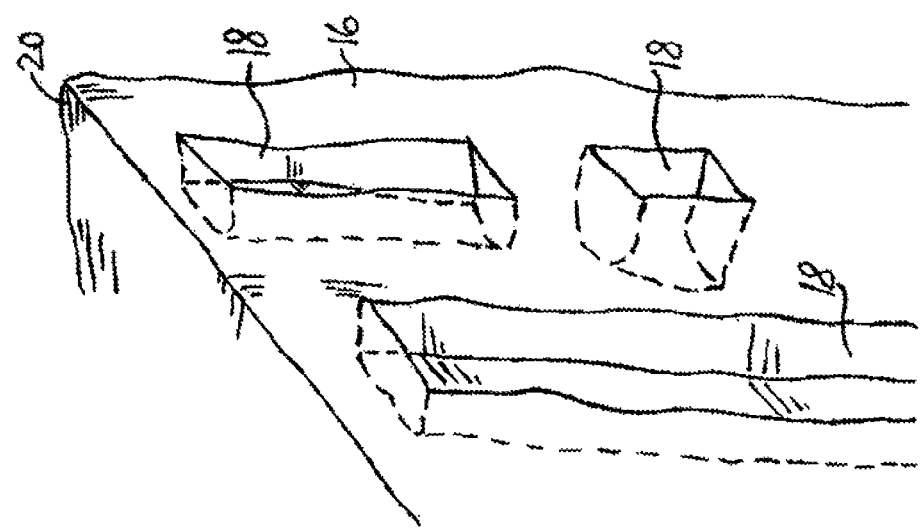
FIG. 2B shows the frontal view of a natural cliff face serrated with crevices and caves excavated by mechanical means.

FIG. 2A shows the adaptation and conversion of a natural relief such as a valley located in between two steep rock cliffs to form a nesting habitat 17. The vertical face of the naturally occurring rock cliffs 16 may be drilled and excavated to make artificial caves 18, caverns, holes, crevices, ledges 57, eaves, to provide nesting and roosting places for swiftlets. Such that cliff face 16 may be gouged and pock-marked with caves 18, indentations 59, protrusions 60, ledges 57; riddled with nooks and crannies manually excavated to maximize nesting surface areas to provide clinging and vertical perching footholds as illustrated in FIG. 2B.

Providing a natural infrastructure adapted and modified by means of human engineering techniques into an extremely conducive reproductive environment favorable for the swiftlets to build their nests during the breeding season is accomplished by modifying natural formation with man-made formations as illustrated in FIG. 2A. The crevices may be constructed vertically, horizontally or as individual caves 18 or holes. The excavations may be serrated horizontally with protrusions and indentations to provide an extremely rough surface for clinging. The entire habitat 17 including cliff face 16, portions of cliff top 20 and other man made nesting structures 15 located at the valley or cliff bottom 19 may be enclosed in an enveloping protective cage 22 surrounded by predator traps designed to keep out or exclude airborne and terrestrial predators. Nesting structure 15 may be constructed of hardened earth, bricks and mortar or stones with an interconnected maze of nesting crevices and vertical perches. Alternatively, cage 22 may also comprise of a solid roof 97 secured to a structure of girders 105. Such an eco-farm integrated into a natural relief may be surrounded by trees and vegetation planted to enhance a natural setting. The farm may be configured to provide adequate nesting capacity to accommodate a densely packed avian colony comprising a million swiftlets.

FIG. 2C illustrates an alternative arrangement in which a single sided vertical cliff face 16 may be converted into a nesting habitat 17 with the erection of a gigantic protective cage structure 22 mounted on girders 21 to provide a safe and secure shelter. FIG. 2D shows a plan view of FIG. 2C while FIG. 2E shows a cross-sectional view along section 2E-2E of FIG. 2D. A myriad of caves 18 are built into cliff face 16. The facility may be protected by a perimeter wall and fence 23 and predator traps comprising of moats 24, bunds 25, metal plates 26 and fence 27. The hoisting apparatus 160 to 180 as shown in FIG. 8A to FIG. 8D may be used for harvesting nests in cavities and caves 18 constructed on cliff face 16.

Figure 2F:
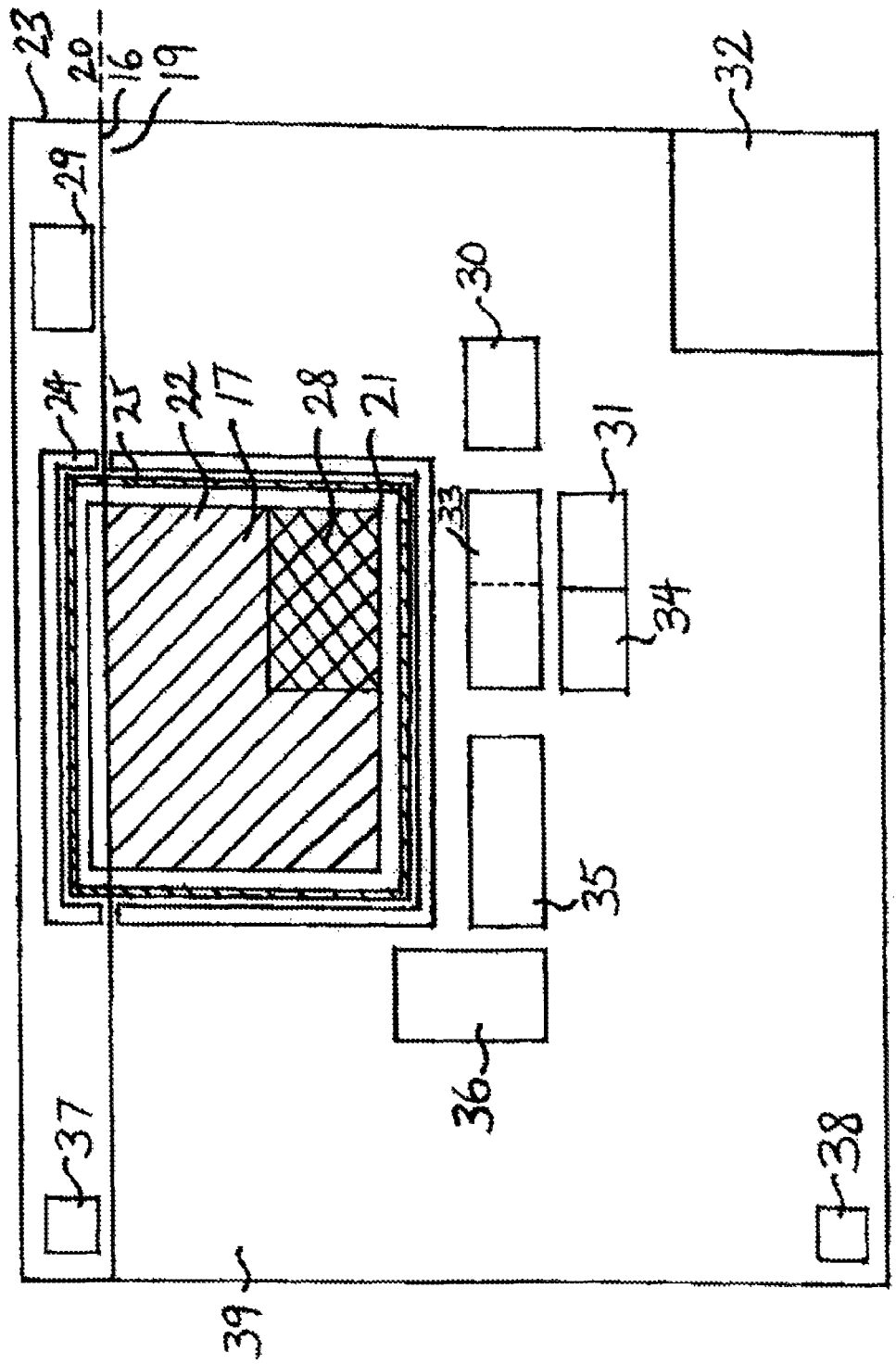
FIG. 2F shows a detailed plan view of the layout of a swiftlets breeding facility for producing edible bird's nests. The main portion of the facility comprising nesting habitat 17 is supported by specialist facilities such as the worms production facility, eggs incubation facility, green houses, transitional facility, nests processing facility, predator traps, etc.

Referring to FIG. 2F is shown the detailed layout plan of an integrated commercial edible bird's nests production facility and eco-farm of present invention configured to breed swiftlets for their nests comprising of the main roosting habitat 17; and associated or related supporting sub-facilities such as the juvenile birds transitional facility 28; a "wormery" 29 for producing worms; incubation facility 30 for hatching eggs; veterinary clinic and laboratory 31; sago logs holding ponds 32; greenhouse cum training school 33 for bringing up chicks and juvenile birds; staff quarters 34; nests processing facilities 35; feed stock processing facility and store 36; open feeding ground 39; protective facilities comprising of an enveloping cage 22 mounted on girders 21; perimeter wall cum fence 23 reinforced with strands of high tension (voltage) wires; predator traps comprising of moat 24; bunds 25; equipment and apparatus such as escape cages 37; insect catching apparatus 38. The avian eco-farm may be configured to include a protective refuge or enclosure such that the main facility comprising the roosting habitat 17 may be totally segregated from the external environment by means of a cage structure 22 and predator traps. The cage structure ensures that the nesting habitat cum sanctuary 17 is completely shrouded or enwrapped in an encompassing protective wire mesh 22.

FIG. 2G shows the frontal view while FIG. 2H shows a detailed cross-sectional view 2H-2H of the layout and construction of predator traps comprising of a combination of moats 24, bund with an inclined ledge 25, an inclined grid of high tension wires 40 and 41 mounted on wooden wedges 43, vertical flat metal sheet 26, barbed-wire fencing 27 with a vertical grid or layers of high tension wires comprising cathodic terminal 40 (−ve) and anodic terminal 41 (+ve) mounted on wooden posts 42. The grid is connected to a source of high voltage electricity supply designed to prevent the habitat from ingress by terrestrial predators such as rats, squirrels, snakes, monkeys, etc. The lower portion of the bund surrounding the nesting habitat may be constructed of compacted earth or concrete topped by an overhanging ledge 25, a vertical sheet of surrounding metal 26 topped by a fence 27 and layers of high tension wires 40 and 41. The inclined ledge and grid of high tension wires and vertical metal sheet prevents predators from clambering up the bunds with ease. The upper portion comprising of fence 27 and a vertical grid of high voltage wires or grid provides further layers of deterrence.

Wires 40 and 41 of the high tension or voltage grid may be spaced 2 cm apart and secured or nailed directly onto wooden posts 42. Wood provides a natural form of insulation such that wires securely attached to wooden posts did not require any additional insulation materials. 'U' shaped nails sharpened at both end may be driven into the wooden posts 42 and wedges 43 to keep the wires in position. The nails may be made of stainless steel SS 316 or SS 304. Alternatively, industrial staples may be adapted and modified for use in place of the nails. Wires with positive and negative terminals may be spaced 2 cm apart and placed at a distance of 1 cm from the inclined ledge 25 by means of wedges 43. 'U' shaped nails sharpened at both end may be driven into the wedges 43 to secure the high voltage terminals in position, preventing accidental contact of the high voltage terminals. The wooden fence posts 42 and wedges 43 may be made of 'belian' a form of termites resistant iron-wood endemic to the island of Borneo. Besides wood, insulation wedges, holders or spacers may also be made of commercially available insulation materials like rubber, PVC, Teflon, etc. The system voltage may be boosted by means of step-up transformers from a normal supply of 220 volts to 415 volts. Or thousands of volts as desired. Current converters may be used to change AC into DC for utility purpose. Such that predators coming into contact with the numerous strands, coils or grid of high voltage wires may receive a nasty shock. Contact with any two of the opposing terminals send electric shocks through the body pulverizing or electrocuting it such that even if the predator is not instantly killed, it prevents further intrusive actions by scaring them away.

FIG. 2I shows the design of the foot of girders 21 supporting the gigantic cage 22 configured for thermal expansion in the tropical climate and (earth-quake) shock proofing. The apparatus (foot of girder 21) rests on a bracket shoe 45 which in turn, rests on top of a tier of roller bars 46 and housed in a bracket body 44. The girder foot 21 is in turn covered by internal and external shoes 47. Shoe 47 protects the apparatus 45, 46 and 47 from corrosion by water. Hole(s) 48 may be incorporated to prevent accumulation of rainwater. Similar configuration may be applied to posts of I-beams, C-channels, T-struts in the construction of other structures of present invention.

FIG. 2J illustrates an access way 49 located at the upper structure of the bird cage 22 (containing the transitional portion of nesting habitat 28, mesh 1 cm×1 cm gap) comprising of a sliding contraption of fine mesh and grills that may be pulled over access way 49. Access way 49 is covered with permanent grills 50 spaced 5 cm×12 cm apart such that gaps are just large enough to allow adult swiftlets to pass through, yet keeping out larger avian predators and birds of prey. The movable portions 52 of the sliding door may be powered by means of a motor, or by means of a manual pulley and lever system.

A pair of *A. maximus* lays one egg three times a year while *A. fuciphagus* and *A. unicolor* lays two eggs per clutch. Theoretically the rate of population increase would be 1.5 times per year for *A. maximus* and 3 times per year for *A. fuciphagus* and *A. unicolor*. This is equivalent to a 3 fold increase in population per year.

*A. maximus* 1 egg × 3 nesting season = 150%, 1.5X population/year
*A. fuciphagus/A. unicolor* 2 eggs × 3 = 300%, 3X population/year

| | | | |
|---|---|---|---|
| *A. maximus* | 1 egg × 3 nesting season | 150% increase in population/year | 1.5X increase in population/year |
| *A. fuciphagus* *A. unicolor* | 2 egg × 3 nesting season | 300% increase in population/year | 3X increase in population/year |

| STARTING | BIRDS | BREEDING PAIRS | YOUNG BIRDS | TOTAL BIRDS |
|---|---|---|---|---|
| 1st YEAR | 20 birds | 10 pairs | 60 | 80 |
| 2nd YEAR | 80 birds | 40 pairs | 240 | 320 |
| 3rd YEAR | 320 birds | 160 pairs | 1060 | 1420 |
| 4th YEAR | 1420 birds | 710 pairs | 4260 | 5680 |
| 5th YEAR | 5680 birds | 2840 pairs | 17040 | 23720 |

In actual fact survival rates of chicks are an unknown quantum at present as no such data is available. In a related study on the breeding biology of the Mountain Swiftlet, *Aerodramus hirundinaceus* undertaken in Twin Falls Caves in Irian Jaya, the island of New Guinea, hatching success rate of eggs was 77%. The fledging success rate was 61%. (Source: Journals>EMU: Austral Ornithology) A general rule of thumb points to a 50% survival rate in the wild. The high rate of chicks mortality may be due to predation, falls from height while learning to fly, death due to the vagaries of nature such as droughts, famine, scarcity of food due to competition, etc. An object of present invention is to maximize swiftlets population by boosting hatchling survival rates to above 90 percent while reducing mortality rate to below 10 percent, in order to increase the production capacity of the facility. Such an objective may be achieved by means of provision of a habitat designed with intrinsic safety features such as nesting cavities incorporating a raised edge 55 at the lip to prevent fledglings from falling out; drains 56 to prevent collection of rain water in which fledglings may drown; safety netting 84 strategically placed below the cliff face 16 or nesting panels 69 to rescue fallen fledglings and chicks which may be then be raised by means of captive breeding by human handlers.

Other safety features designed into the habitat includes an outer encircling walled structure and fence 23; predator traps 24, 25, 26, 27, 40, 41; enwrapping cage structure 21, 22; solid roofing 97 and walled structures 101, 102, 104; elevated angles and slanted surfaces (from Right to Left on panel 69) providing drainage to keep the habitat dry, cool and well ventilated at all times; elevated angles slanted from the front towards the back of the nesting cavities of panels 69a.

To cater for an increase of avian population, roosting habitat 17 of the eco-farm and cage structure 21 and 22 may be extended and expanded with addition of new units adjacent to existing facilities through conversion of non-productive cliff face into inhabitable nesting areas for swiftlets. Alternatively in the case of the single sided cliff, newly extended areas need not necessarily be shrouded in a protective cage structure 22 because in case of predatorial airborne threats, all birds can take refuge in the existing safe haven 17. Whereas, the wholly man made artificial cave structure 100 may be extended at one end of the cave to cater for demographic increase in avian population. The roosting habitat 17 may be a man made nesting structure constructed and modeled to resemble as far as is practicable natural environment and conditions in which cave dwelling swiftlets thrives.

In another embodiment, specialized man-made ground based structures may be built in habitat 17 to raise captive bred birds which had undergone acclimatization and conditioning to the man-made roost. FIG. 3A and FIG. 3B shows a man made roosting structure 15 made of hardened earth enhanced with concrete and rocks arranged in the form a hill or cliff with hollowed out nesting compartments 18 to increase the nesting capacity of the habitat. The roosting habitat 17 may be constructed at the base of the cliff 19 and enclosed in a mammoth protective cage 22 surrounded by wall cum fence 23 and predator traps 24, 25, 26 and 27. Pieces of rock chips and gravel produced from the excavation of caves, caverns and ledges on cliff face 16 may be used for building roosting structure 15.

FIG. 3C and FIG. 3D shows an arrangement of pre-fabricated blocks of hollowed out bricks 54 used to construct a nesting habitat for swiftlets. The blocks are arranged and spaced to maximize vertical nesting surfaces such that birds may cling to the internal hollows and cavities 18 or the external surface of the pock-marked bricks 54. Both ends of brick 54 may be designed with a raised lip 55 and the flooring may be slanted towards drainage channel 56. Internal surface of the bricks may be serrated with indentations 59 and protrusions 60 providing perching and gripping surfaces for the sharp claws of the birds. Such blocks of hardened earth bricks 54 may be bound together with filler materials comprising wet sticky clay 53 or cement and arranged in a stable manner with a larger bottom base tapering off at the top as shown in FIG. 3C for stability. Cavities in between blocks 54 may be interconnected to provide a passage 58 for wind and to enable birds to move more freely.

FIGS. 3E and 3F shows differing forms of caves, cavities and crevices 18 built with a drain 56 to drain off rain water and a raised edge 55 to prevent chicks from falling out of the cavity. Such features may be included into the construction of groves and ledges 57 on the cliff face to avoid collecting water and to provide a dry environment for the birds to perch or nest. Protrusions 60 and indentations 59 may be created by drilling and manual chiseling. Such features may be purposely made during construction of crevices to provide gripping surface and nesting niches for swiftlets.

The bottom of ledges and groves may be constructed at a slighted inclined angle to enable natural draining of rainwater into drain 56 after a tropical downpour. Such a feature may prove valuable during the breeding season. Young chicks may drown in stagnant water collected in the crevice if it falls out of the nests. Raised edges 55 of the nesting crevice 18 may be helpful in preventing young birds that had fallen out of its nests from crawling and falling out of the nesting cave, over the vertical cliff to certain death. A piece of wood or wire gauge netting placed across the bottom of the crevice entrance may serve a similar purpose.

FIG. 3G shows bird's nests 62 built into a natural cliff face with only slight indentations and protrusions. Adult swiftlets 61 sits in the nests to incubate a clutch of eggs.

FIG. 3H shows the cross-sectional view 3H-3H of FIG. 3E.

Figure 4A:
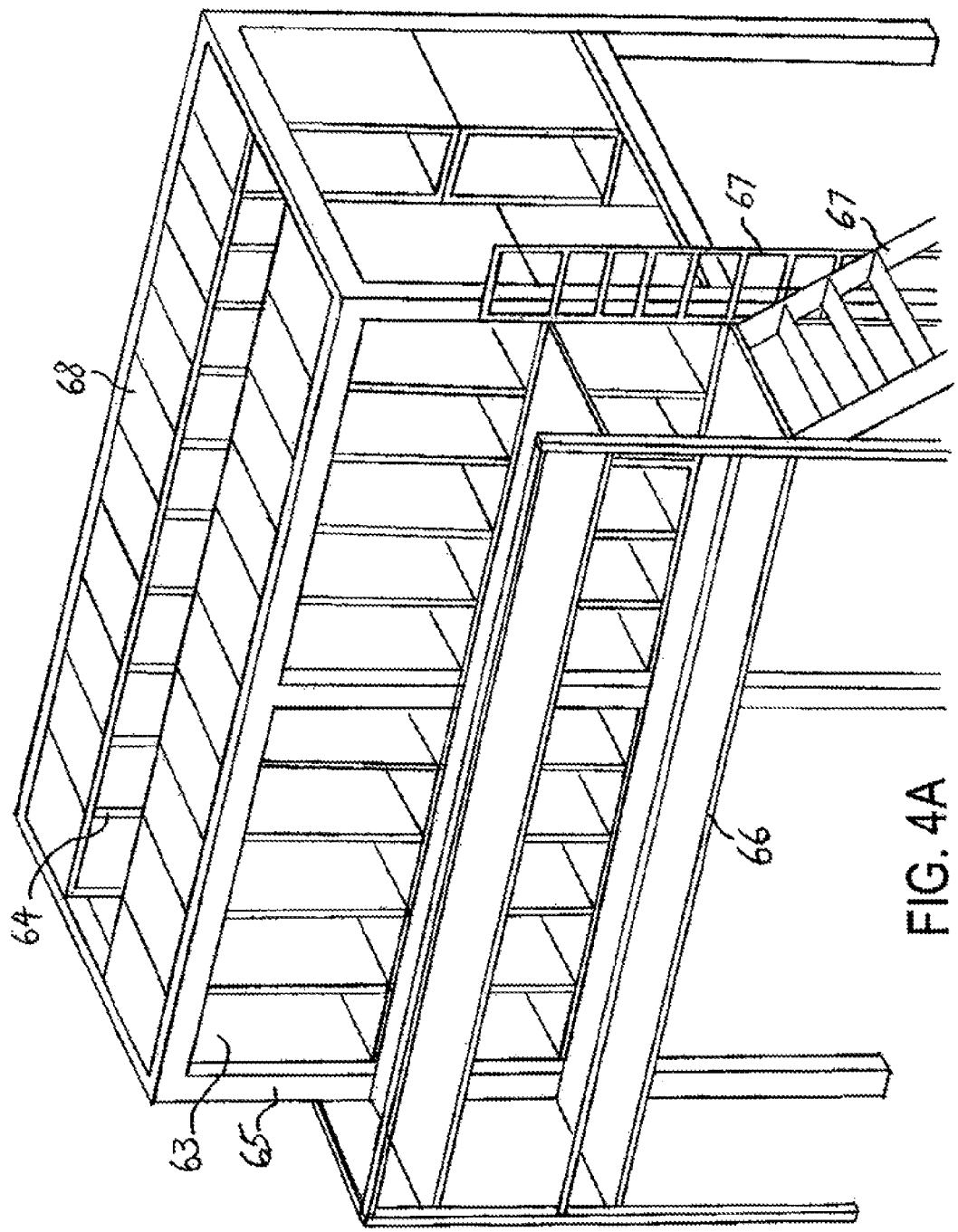
FIG. 4A shows an artificial nesting structure built with concrete or wooden frame and pre-fabricated nesting panels to form compartments and slots comprising the internals.

FIG. 4A illustrates the arrangement of an artificial nesting structure and configuration such that a series of slots or nesting cavities 63 separated by panels 64 manufactured from wood, poly-ethylene, polystyrene, poly-propylene, PVC, concrete, cement, etc. may be arranged and housed inside a frame work 65 comprising wooden or concrete pillars, flooring and walkway 66, staircases and ladders 67. Pre-fabricated boxes 68 came complete with built-in nesting cavities and crevices 63. The internals of cavity 63 may be serrated with indentations 59 and protrusions 60 to provide vertical gripping footholds for swiftlets. Walkways 66 surround the nesting structure to provide ease of access by the farmers and bird handlers. Alternative materials for construction may comprise plant fibres, cement, fibrous and other binding materials.

Figure 4B:
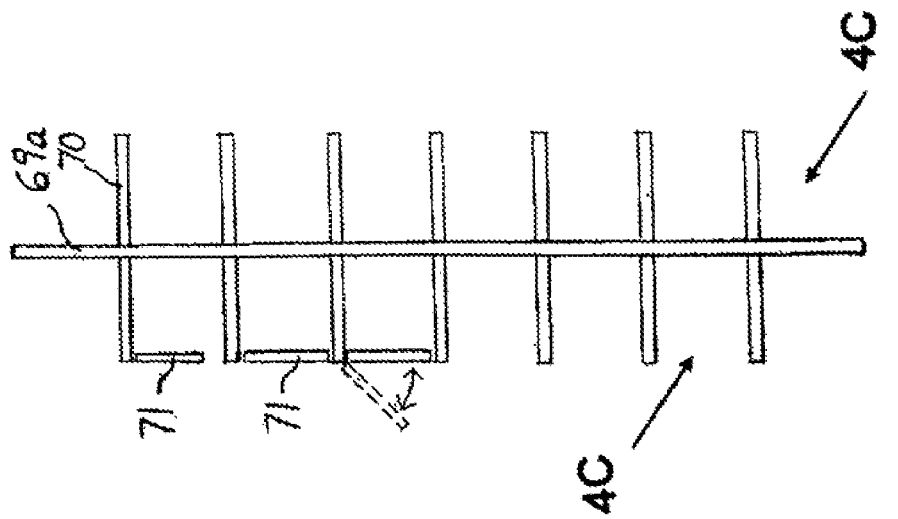
FIG. 4B shows the plan view of a rectangular shaped nesting structure built of fixed and movable panels attached together.
Figure 4C:
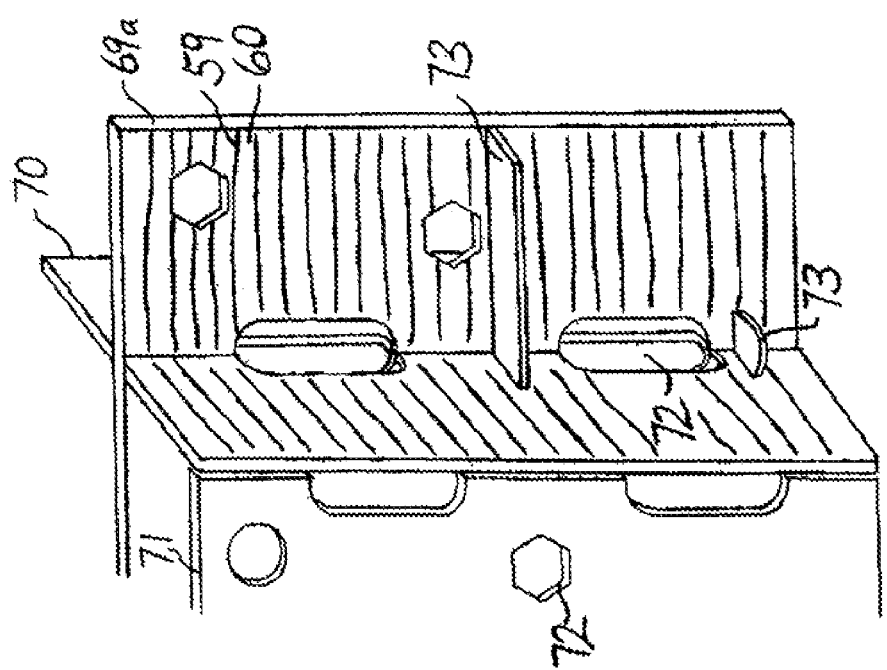
FIG. 4C shows a cross-sectional view 4C-4C of FIG. 4B formed by the nesting panels, perforations and attachment boards described in relation to FIG. 4B.
Figure 4D:
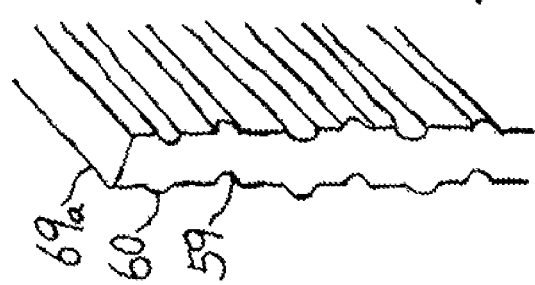
FIG. 4D shows a detailed view of the nesting panels with grooves, indentations and protrusions to provide vertical perch.

FIGS. 4B, 4C and 4D shows a purpose built nesting habitat in the form of a rectangular box shaped structure comprising of a fixed panel 69a and numerous fixed side panels 70. Panels 71 are movable. Panel 69a, 70 and 71 forms vertical walls with roughened screed surfaces with indentations 59 and protrusions 60 for vertical perching as shown in FIG. 4D. Attachment boards 73 may be affixed to panels to strengthen the structures and serves as ledges upon which nests may be built. Perforations 72 provide passage for wind and swiftlets between panels.

Figure 4E:
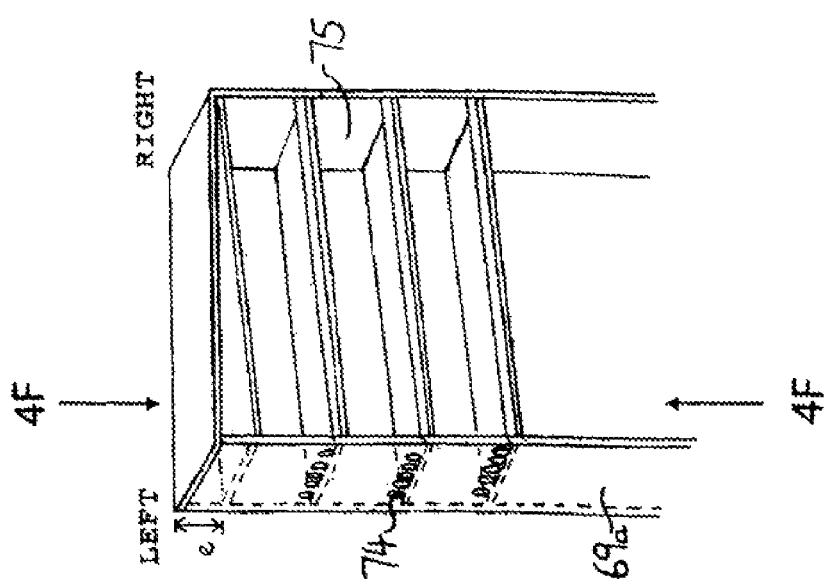
FIG. 4E shows an alternative nesting panel designed with nesting channels placed at an inclined angle (slanted from right to left) to provide secure nesting cavities.

FIG. 4E shows another form of structural configuration in which the nesting panel is designed to maximize provision of nest building surfaces by means of C-shaped nesting channels 76. The flanks may be covered at both ends to prevent hatchlings from falling out and incorporates water draining holes 74 on the left flank of panel 69a to keep the cavities 75 dry. The channel 76 may be inclined from right to left (as indicated by 'e') and inclined from the front towards the back for ease of draining rain water as shown by cross-section 4F-4F in FIG. 4F. Serrations comprising indentations 59 and protrusions 60 provide vertical clinging surfaces. One side of the panel may be used for vertical perching while the other side may be used for building nests and perching.

Figure 4F:
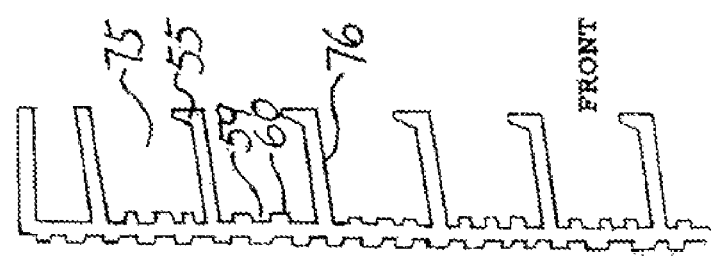
FIG. 4F shows the cross-sectional view 4F-4F of FIG. 4E, with the inclined nesting channels. The cavities are slanted from the open front part towards the back of the panel with raised edges.
Figure 4G:
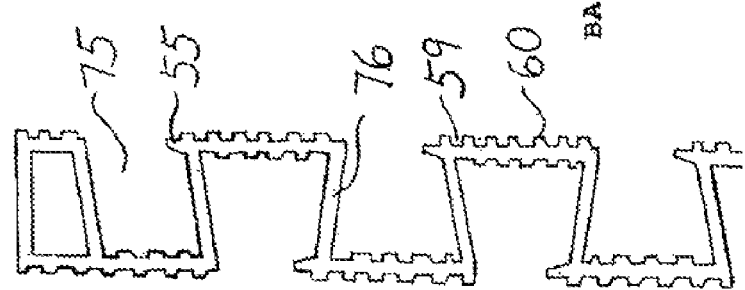
FIG. 4G shows an alternative panel design with a jig-jag pattern such that the floor of the cavity above forms the roof of the cavity below. The floor is inclined from the front towards the back of the panel with raised edges. Serrated surfaces, protrusions and indentations provide vertical perches.

FIG. 4G shows an alternative form of arrangement as disclosed in FIG. 4E and FIG. 4F in which nesting channels 76 may be configured in a jig-jag form such that a perching protrusion on one side forms the nesting cavity 75 on the opposite side. Such that either sides of panel 69a may be used for perching and building nests. The floor 76 of a nesting cavity 75 on top forms the roof of the nesting cavity beneath. The floor and roof 76 of the nesting channel may be inclined from the raised edge 55 towards the back wall (slanted from the front to the back). Serrations 59 and 60 may be provided on the internal surfaces of cavity 75 of panel 69a for hatchlings to perch. At 2 to 4 weeks old, swiftlet chicks climbs and perches vertically on the wall. An internal cavity perch is conducive for their safety, such that even if they loose their grip and fall, they remain within the cavity 75, not to certain death hundreds of meters below.

Figure 4H:
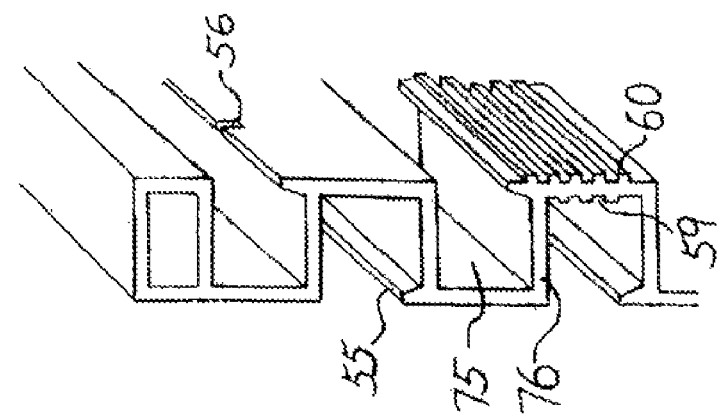
FIG. 4H shows an alternative panel design similar to FIG. 4G, with horizontal roof and floor including draining grooves.

FIG. 4H shows yet another alternative form of FIG. 4G in which the corners and edges of the nesting channels forming the panel 69a may be placed horizontally but incorporates draining groves 56 to remove rain water. Raised edges 55 prevents chicks from falling out of the cavity while indentation 59 and protrusion 60 provides vertical perches.

Average width and height of the nesting channels may measure 5 cm×8 cm. Or the channels and cavities (cross-section wise) may be made 10 cm wide×10 cm high if desired to suit *A. maximus* which is larger in size. The dimensions and measurement of nesting channels and cavities 76 may be varied to suit the specific needs of different species of swiftlets and design needs of the habitat. Channels 76 of panels 69a may be designed with raised edges 55 incorporating draining groves 56. The raised edges 55 provides a more secure crevice to prevent chicks from falling out of channel 76 while the draining groves 56 and holes 74 prevents collection of rainwater. Hatchlings falling out of their nests may drown in rain water collected in channel 76. Design features include inclined and slanted groves with an inclined and non-horizontal design to avoid collection of rain water.

In another form, the groves and ledges on panel 69*a* may be designed at a slight inclination from the horizontal position to provide a slight slanting angle 'e' such that rainwater naturally flows towards the draining points 74 or 56 on the panels. Numerous holes and perforations 72 are built into the panels for ease of access by swiftlets. Perforations 72 in the panels may also provide a path for wind to pass through the nesting structure thus reducing stress and strain caused by strong gusts of wind, keeping the habitat cool and dry. For low structures, the moveable panels 71 provides for easy access by human keepers to check, remove eggs, harvest nest, clean bird shi and guano. Apart from such activities, panels 71 would be kept immobilized.

Such nesting panels 69*a*, 70 and 71 may be constructed of concretized materials such as BRC, sand, wire nettings, metal rods and bars; prefabricated concrete; fiber glass; chalk, limestone, silicates, carbonates, etc. reinforced with natural and artificial fibers or other binding materials. The nesting cavities 76 may be coated with a layer of powder or pieces of ground rocks mixed with a binding agent such as cement. The rocks may be ground from naturally occurring rocks containing a variety of minerals and salts in different concentrations. Different rock types and compositions may be tested out to study the possible effects different chemical concentrations have on the bird's nests, their quality, taste, aroma, crunchiness, etc. if any. No data is available as no research had been carried out in this area.

Panels may be mounted in the groves of galvanized channels comprising C, U, I and H shapes with adequate horizontal or lateral space of 15 cm to 20 cm left in between pieces of panels 69*a* (top and bottom) for passage of wind and birds. Depending on the design configuration of the habitat, thousands of pieces of panels 69*a* measuring 2 m×5 m×15 cm may be assembled together by means of a lattice of galvanized channels to form a single vertical panel 69 rising 300 meters in height, stretching ten kilometers in length and 15 cm in thickness. Individual pieces of panels 69*a* may be configured as desired to be of any suitable measurement to meet site utility requirements. Main panels 69 may be marked for ease of management and care-taking purposes.

The nesting structure 69 comprising pieces of panels 69*a* mounted in galvanized channels (such as C, U, H, I shaped channels) may be constructed securely on concrete base and attached together with mortars or cement, reinforced with numerous struts 83 and anchored to I-beams structure 80 and 98. The mounting channels may be dipped into cement slurry and become encased in a protective layer of concrete to prevent corrosion. The whole structure may be constructed on a small hill or earthen mound inside of habitat 17 totally covered by cage structure 22 or solid roof 97. Such nesting panels of compatible measurements may also be placed inside vacant human dwellings 11 and man made structures 14 to increase the nesting capacity of the shelters.

Figure 4I:
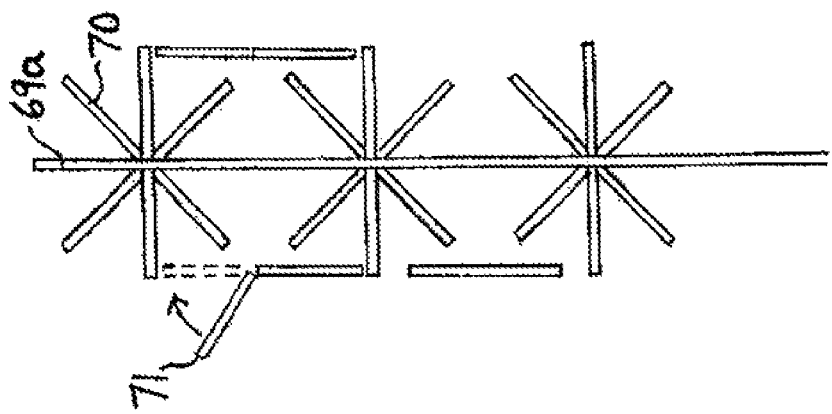
FIG. 4I shows the plan view of an alternative arrangement of panels as shown in FIG. 4B and FIG. 4C providing an octagonal structural configuration to maximize vertical nesting surface area.
Figure 4J:
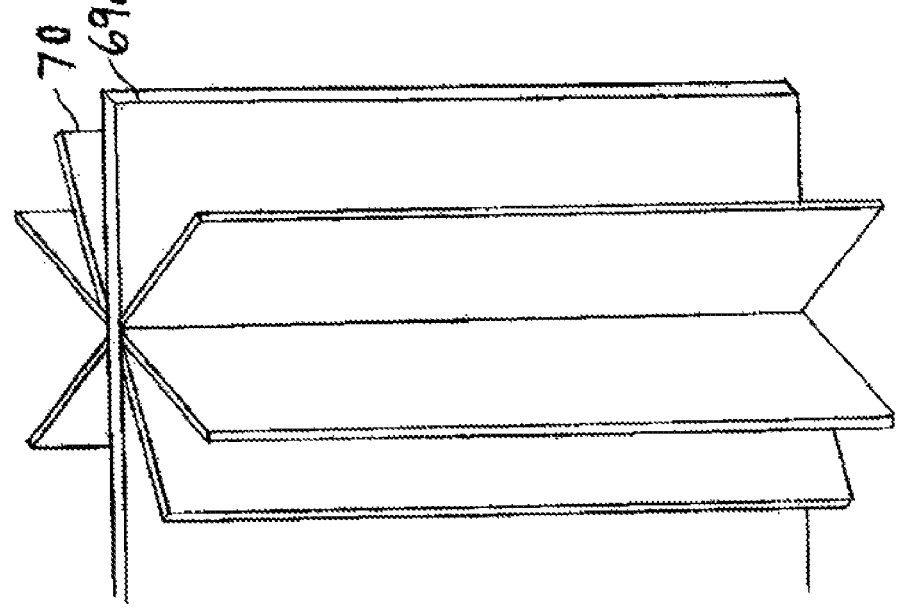
FIG. 4J shows an elevated isometric view corresponding to the plan view of FIG. 4I.
Figure 4K:
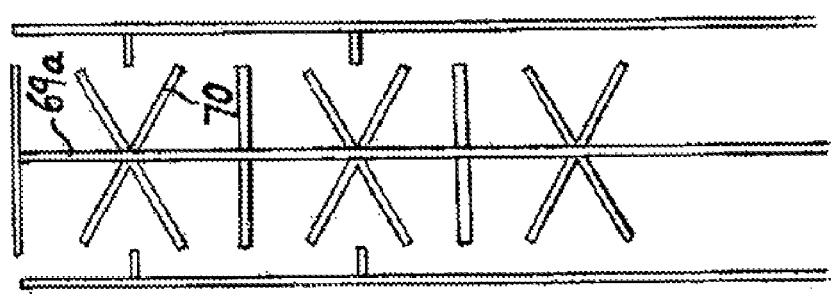
FIG. 4K shows the plan view of another alternative arrangement of panels as shown in FIG. 4B, FIG. 4C and FIG. 4I providing a hexagonal structural configuration.

FIG. 4I shows the plan view of a variation of the nesting panel as shown in FIG. 4B such that panel 69*a* may be flanked by side panels 70 and moveable panels 71 forming an octagonal structure. FIG. 4J shows an elevated isometric view of FIG. 4I. FIG. 4K shows another variation in which the panels form a hexagonal shape.

Figure 5A:
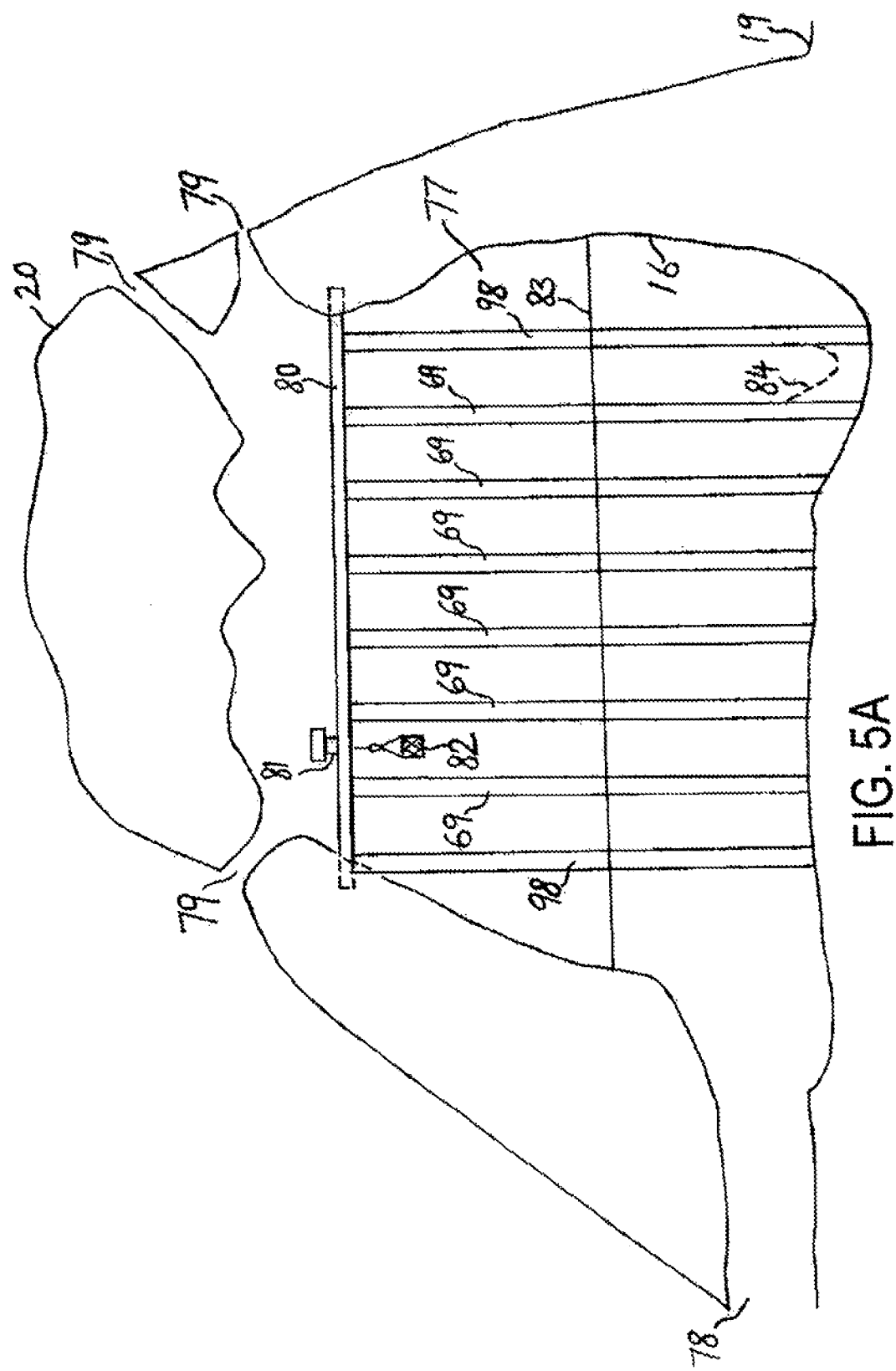
FIG. 5A shows a cross-sectional view of a natural cave modified to accommodate a huge population of swiftlets by means of nesting panels to increase nesting surface areas and roof-top based access ways.

FIG. 5A shows the cross-sectional view of another embodiment of present invention in which a naturally occurring cave 77 not inhabited by swiftlets may be acquired for conversion into a commercial swiftlets breeding and production facility for producing edible bird's nests. Such caves may be configured and transformed into an avian eco-farm upon conversion of said natural relief with the provision of man made facilities and structures comprising: horizontal I-beams 80, concrete reinforced vertical I-beams 89, hoist beam 81, work cage 82, nesting panels 69*a* mounted in a framework of galvanized channels (C, U, I, H shaped) to form main panels 69, supporting struts 83, safety netting 84, aerial access-ways 79, etc. in combination with a captive breeding program and specialized techniques as disclosed in present invention for breeding domesticated swiftlets for the production and collection of tons of edible bird's nests. I-beams 80 and 89 may comprise reinforced concrete pillars. Cave walls 16 may be modified with nesting crevices 18, ledges 57 and roof based aerial access-ways 79 excavated to provide routes for avian passage. Struts 83 comprising metal bars or large bracing wires are used to hold the main nesting panels 69 in position and to reinforce the structure of nesting habitat 77. Electric lights attached to cage 82 may be powered by 12-volts batteries or 12-volts lighting cables providing lights for collectors. For illustration purpose, only individual pieces of panel 69*a* is described herein for constructing main panel 69. Other features as disclosed such as panel 70, 71, rectangular shape, octagonal shape and hexagonal shaped structural configurations may also be used.

The I-beams 80 and 89 provides a structural frame work for anchoring a lattice of galvanized metallic channels (C, U, I, H shaped) into which individual pieces of smaller sized nesting panels 69*a* measuring 10 m×5 m×10 cm may be are installed and slotted to form the main nesting panels 69. Individual panels 69*a* are placed into the indentations and groves present on these metallic channels. Main panels 69 may measure 100 m×50 m×10 cm. The structure also supports installation of an overhead crane or hoist 82 mounted on moveable hoist-beam 81. Motorized hoists 82 may be used initially for construction and conversion of natural cave 77 into nesting habitat 17 and later on for the collection of eggs and chicks for captive breeding, harvesting nests and for facility checks, inspection, repair and maintenance work. Access via the terrestrial entrance 78 may be controlled by means of gates, guards and predator traps.

Figure 5B:
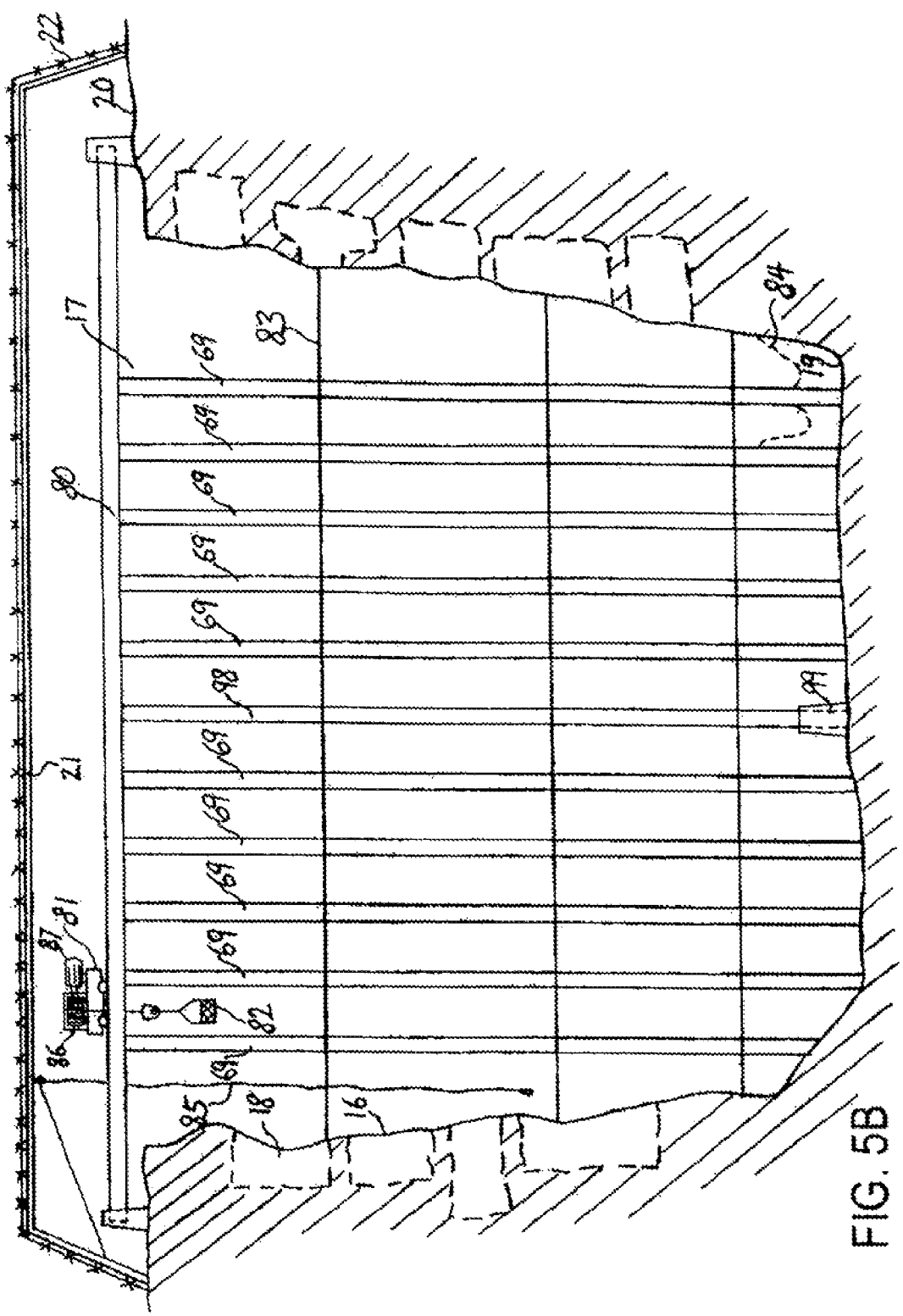
FIG. 5B shows a cross-sectional view of a converted valley in an alternative arrangement such that the features of FIG. 2A to FIG. 2J may be combined and integrated with FIG. 4B to FIG. 4G to form an ultra high density nesting habitat.
Figure 5C:
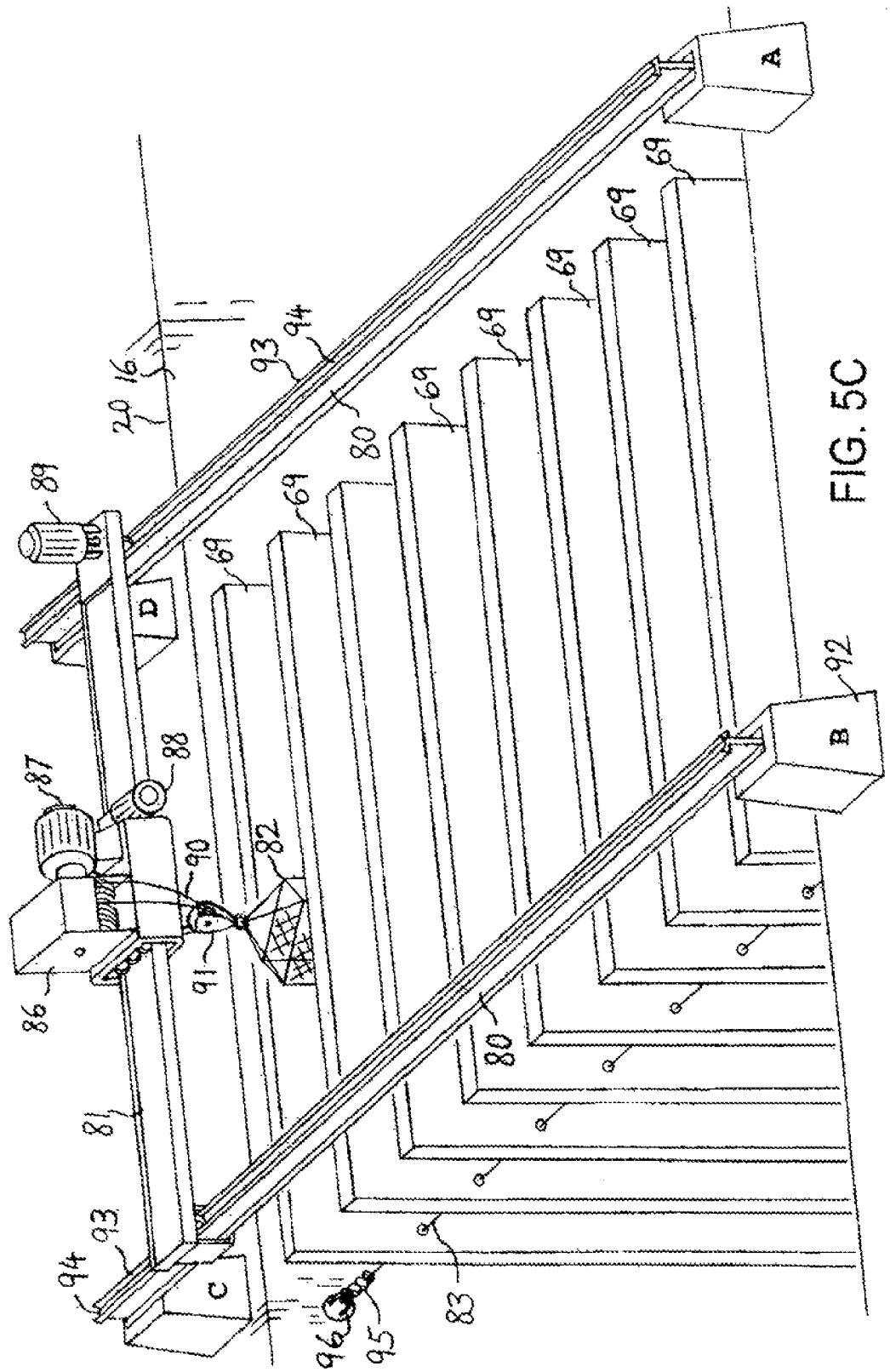
FIG. 5C shows the top view of FIG. 5B in particular the mechanized lifting systems and arrangement of nesting panels.

In yet another embodiment the features of FIG. 2A to 2J may be combined and integrated with FIG. 4B to FIG. 4G to form a high density habitat 17 as shown in FIG. 5B and FIG. 5C (top view), such that the valley may be turned into a high rise nesting habitat for breeding swiftlets in an avian "condominium." A lattice of galvanized steel channels comprising C, U, I, H and V shaped channels attached to a structural framework provided by I-beams 80 and 89 may be used to hold nesting panels 69*a* in place. I-beams 80 and 89 structural framework may also be used to mount an overhead hoists system 81, 82, 86 to 91. Each main panels 69 may be mounted vertically and assembled from a hundred individual pieces of smaller sized panels 69*a* (10 m×5 m×10 cm) to form a gigantic double sided nesting wall measuring, for example, 100 meters in height×50 meters in length×10 cm thick. An adjacent panel built end to end with the first panel extends the length to 100 meters. Now the main panel 69 measures 100 m×100 m×10 cm. The total length of main panel 69 may be extended further with the addition of new panels as the population increase. Such a configuration provides maximum surface area for nesting. Side panels 70 may be added and attachment boards 73 may be affixed.

A man made panel 69, similar to a natural valley had two vertical faces. Ten pieces of panels spaced at regular intervals constructed in the natural valley increases the vertical nesting surface area of the modified valley by 10 times. Upon modification, the valley is now able to support a colony of swiftlets 10 times the population density of its original and naturally occurring capacity. Likewise, if the valley is fitted with 20 vertical nesting panels, conditions permitting, it shall be able to support an avian population density 20 times of its initial nesting capacity. Such man made modifications improves the overall efficiency of the production facility, its cost effectiveness, economies of scale and high productivity per unit area or per unit volume of the edible bird's nest production facility. Wire cage 22 and girders 21 covering the habitat may also be replaced and substituted by a solid roofing structure 97 mounted on girders 105.

Referring to FIG. 5C, the moveable I-beams mounting 81 may be installed for operating a crane or hoist to lift workcage 82. The mechanized lifting system may comprise of specially adapted equipment configured to suit the specific utility purpose of the edible bird's nest production facility. Standard industrial lifting equipment including cable drums 86, cable 90, block and tackle 91 powered by electric motors 87, 88 and 89 may be acquired for use in the avian eco-farm. Main motor 87 moves load 82 vertically up and down in between nesting panels 69; motor 88 moves the load, workcage 82 between point AB and point CD, from one end of the main nesting panel 69 to the other end; while motor 89 moves the work-cage 82 between point AD and point BC, from one nesting panel to another. Hoist beam 81 is supported and moves on top of a frame structure of I-beams 80 resting on reinforced concrete bases 92. Protruding rails 93 and groves 94 on the I-beams 80 acts as guide rails for propulsion of the overhead hoist.

The hoist system 82 may initially be used for constructing the nesting habitat; later for inspection, repair, maintenance work and for collection of eggs, swiftlet chicks and harvesting of edible bird's nests built on panels hundreds of meters above ground level. Struts 83 holding the nesting panels in position with washers may be firmly attached to the cliff face by means of hooks 96 and spring 95 designed to cushion distortional forces. The lattice work of channels (I, H, U, C, V shaped) holding main panels 69 together may also be partially attached and secured to the structure of I-beam girders 80 at the top, and mounted on a concrete base at the bottom.

Occupational safety and health hazards associated with working at great heights collecting edible bird's nests, eggs or hatchlings hundreds of meters above the ground may be mitigated with control measures, industrial lifting equipment, a rigorous safety management system and proper training of personnel. Safe access to work at great heights may be achieved by means of standard industrial hoists and tower cranes, winches, mobile cranes, man-lift trucks and associated lifting equipment. A hoist designed to lift 5 to 10 tons of load may be used for lifting a work cage 82. Or two persons seated side by side facing the opposite direction may be able to thoroughly work and comb through sections in between two nesting panels facing each other as the work-cage 82 is hoisted up and down the vertical faces in combination with horizontal movement. In an alternative seating arrangement, a team of four collectors seated in a straight row with each alternate person facing the opposite direction may be used to cover a larger area.

Use of safety belts and harnesses integrated into the manlifts 82 being made mandatory such that only upon a positive buckling-up permissive logic from the seats may the controls of a hoist or crane be operated and activated by the occupant (s). Each collector may also be secured to double strands of safety lines 85 affixed independently of the lifting and hoisting apparatus. The securing point for the safety line 85 may be the top roofing structure 105 or girders 21 of the nesting habitat 17. Safety cable or line 85 may be designed to move along secure railings built parallel to the orientation of the nesting panels such that the safety lines closely follow collectors moving from one end of the main nesting panel 69 to the other end. The railing may be secured to the structure of girders 105. (Referring to FIG. 5C: between point BC and point AD). The safety line may also be released and reeled in automatically as the hoist is moved up and down the main nesting panels 69.

Alternatively, line 85 may comprise of fixed lengths of double stranded lines running from the top roofing structure 105 to the ground level. Line 85 may be weighed down with a slight weight (e.g. 2 kg) at the bottom end of the line to keep it taunt. Such that as the collector moves up or down at slow speed, the safety clip allows and follows this movement, sliding freely up or down safety cable 85. If and when the load (collector) moves down at a fast speed, the clip automatically locks and lashes onto line 85, gripping tightly onto it to arrest and stop the load from falling further. Such safety clips based on similar working principles are widely used in vehicle seat belts, mountaineering equipment and industrial safety systems for working at heights. They are readily available in the market and may be acquired for use. For the purpose of redundancy a minimum of at least two pieces of safety clips must be used by each collector, each clip securely attached to one strand of line. Four pieces being the ideal figure. Functional tests for such safety clips may be made mandatory before a collector starts work each and every time he secures himself to the safety line. He may test the integrity of the safety clips by pulling the clips down line 85 at speed, and ensuring that the clips locks and latches onto line 85 each time.

The control room should have overall control of the operations of all mechanized lifting systems with secondary control being delegated to the collectors and harvesters upon requisition via radio communication and confirmation by means of CCTV monitoring of the work area. Securing of personal safety harness(es) to work cage 82, and attachment to safety lines 85 being made a mandatory requirement such that positive confirmation of the attachment of safety lines 85 forms an essential signal input for the electronic logic sequence to supply power to the mechanized lifting systems.

In one form of intrinsic safety design, a low voltage current (12 volts) is input into the cables of safety line 85 and work cage 82. Safety lines 85 may form the positive terminal while work cage 82 and the main hoist lines 90 forms the negative terminal. Only when safety lines 85 are properly secured to the work cage 82 at designated points can the electrical circuit be complete. This complete circuit forms a positive input signal to the PLC to enable power to be supplied to the hoisting mechanisms. If the safety lines are removed, this circuit is broken, and power to the hoist is cut off. The control center may over-ride such a power cut off to lower the work cage 82 safely to the ground. Similar mechanisms may be applied to the safety harnesses and safety belts attached securely to the seats of work cage 82 to form another positive input signal to enable the mechanized lifting system to power up. Circuits from the 12 volt supply may also be connected to lamps providing light to the nest collectors. If these lights fail the collector is visually alerted and immediately aware that the safety line connection to his safety harness or safety belts of work cage 82 may be faulty. He may immediately double check his life-lines 85 and to inform the control room. Such redundancy in intrinsic safety design ensures the safety of collectors harvesting edible bird's nest at great heights, and minimize risks involved with such occupational hazards. In contrast traditional methods of collecting and harvesting edible bird's nests by means of flimsily constructed climbing apparatus had resulted in many nest collectors having fallen to their deaths from great heights. Use of such unsafe equipment should be avoided. If no mechanical lifting systems are available for access to collect nests built into inaccessible nooks and crannies, modern mountaineering equipment should be employed, not for pleasure or thrill, but for occupational purposes.

Pieces or lengths of fine mosquito netting or soft silky cloth 84 may be arranged at the bottom of the cliff face 16 or nesting panels 69 to form a safety net to save the lives of swiftlet chicks that had accidentally fallen out of their nests or fledglings learning to fly but failed to execute proper take-offs or lost control during the maiden flight. The netting may be secured by means of pliant elastic bands which would bounce, helping to cushion and absorb the shock of falling chicks. The netting may be placed in a slanting position such that fallen fledglings may be naturally diverted by gravity towards collection points to be brought to greenhouse 33 for rearing. Reduction in avian infant mortality rates helps to ensure a larger population for producing edible bird's nests.

FIG. 5D shows the cross-sectional view and illustrates the conversion of a single sided cliff face 16 as shown in FIG. 2E above, into an integrated facility for breeding a huge colony of swiftlets for producing tons of edible bird's nest by means of providing thousands of nesting panels 69 mounted in a framework comprising of girders and I-beams structure to which is attached a lattice of channels shaped in the form of (C, U, I, H and V). Each main panel 69 may measure 200 meters (height)×100 meters (length)×10 centimeters (thickness) and may comprise 400 pieces of small sized panels assembled together, each slotted into the grove and indentations provided by these galvanized channels. C and U shaped channels may be used at the edge of main panels for framing a single side of panel 69, while I and H shaped channels may be used in the middle portions of main panel 69 for securing two pieces of panel 69 together. Each individual piece of panel 69 may measure 10 m×5 m×10 cm. Physical arrangements and configuration of the size of main panel 69 may be varied to suit local terrain and geographic conditions (e.g. cliff height). Such that an unproductive natural relief may be turned into a highly productive breeding facility for producing edible bird's nest upon such man made modification. Horizontally mounted I-beams 80 may be supported by vertically mounted I-beams 98. The surface of the beams may be covered with concrete while the lower part of I-beam 98 may be encased in reinforced concrete footings 99 to prevent corrosion. Top roofing 97 may be constructed of solid covers made of concrete and roofing materials comprising corrugated zinc or galvanized metal sheets, calcium silicates, calcium carbonates such as chalk, limestone or water resistant wood chips bound together with binding materials. Such materials are readily available in the market and may also be acquired for constructing roofing and roosting panels. Roof 97 is securely attached to the I-beam structure 80, 98 and cliff top 20. The facility may include mechanized lifting systems and equipment 81, 86, 87, 88, 89, 90, 91 and mobile work station 82; hoisting apparatus 160 to 180 as shown in FIG. 8A to FIG. 8D may also be used for collecting nests built in cavities and caves 18 on cliff face 16; support struts 83, safety netting 84. The flanks may be fully covered by solid walled structures constructed of wood, bricks, stones and concrete, while other parts of the habitat may still be covered in cage structure 21 and 22.

Normally, the interior of the roof 97 has a low air flow compared to the exterior, which comprises natural air drafts of variable wind speed due to dynamic changes in weather and climatic conditions. During tropical storms, strong gusts of wind may blow over the external structure of the roof 97, while the slight draft of the internal surface remains unchanged. This difference in wind speed between the interior and exterior of roof 97 creates a differential pressure since slow moving air exerts a higher pressure than fast moving air. Thus the air pressure acting on the internal surface of the roof is greater than the air pressure exerted on the external surface, causing a wind-lift effect as experienced by the aerodynamic shapes of aircraft wings.

Such a wind-lift or wind-levitation ("wind-lev") effect may cause the roof 97 to shear and be blown off easily. Top roofing structure 97 and 105 may include multiple wind-speed monitors and dynamic pressure sensors 118 mounted on the exterior and interior of the wholly man made artificial cave structure 100. During gusty weather conditions, specially configured trap doors 110 on the roof may be designed to automatically swing open allowing wind from the exterior of roof 97 to enter habitat 17. Conversely, the vacuuming effect of the external draft sucks the interior air out of habitat 17, causing the internal draft to move faster. Such that interior wind speed picks up until it nearly equalizes the external wind speed. In one form, vanes type trap doors 110 may be activated by means of manual or motorized systems to prevent and avoid stress, strains and damages caused by wind-lev to the roof structure (due to pressure differential). Such vanes type trap doors 110 may be manually activated by the control room when the automated doors 110 failed to cope with the wind lev. effects. Or, coupled to automated activation electronics to open or close by itself.

In another form, trap door 110 may comprise of a spring loaded sliding apparatus designed to open automatically by means of wind-lev effects. Trap door 110 may be designed to open outward during windy conditions. Higher internal air pressure pushes trap door 110 upwards such that the spring loaded doors are automatically pulled open by the springs. Thus wind from the exterior enters the interior of habitat 17 and moves the air in the vicinity of the interior surface of the roof before dispersing through exit points. As the internal wind speed picks up to equalize the external wind speed, the wind-lev effects on the roofing structure is neutralized and cancelled out.

Figure 5F:
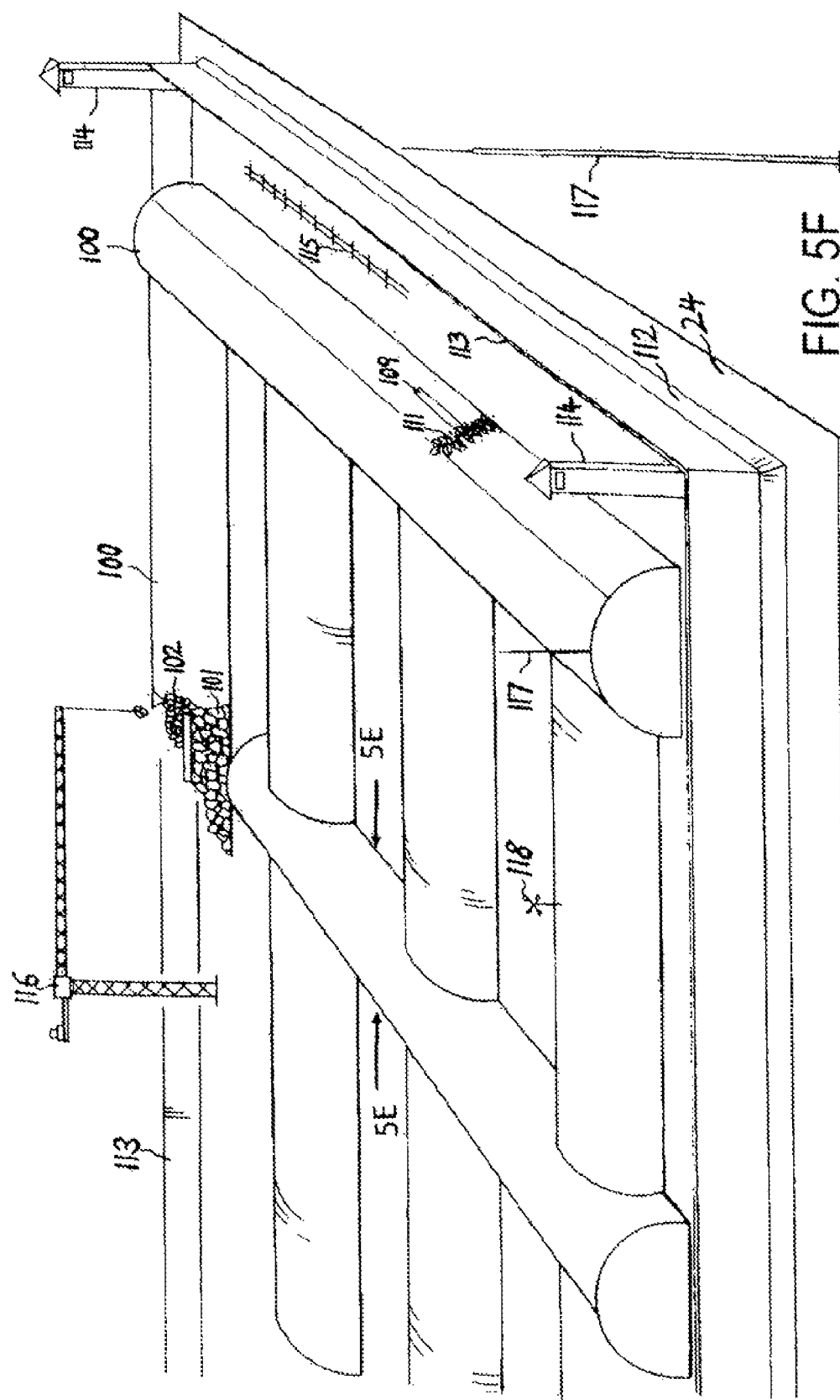
FIG. 5F shows the layout view of a gigantic expandable and scalable system of a wholly man made artificial cave structure 100 comprising the main structure of the edible bird's nest production facility used for breeding swiftlets.

FIG. 5E shows the cross-sectional view 5E-5E of FIG. 5F in another embodiment of present invention. A wholly man made artificial cave structure 100 both emulative and simulative of naturally occurring cave like conditions may be constructed to form an edible bird's nest production facility to breed and accommodate an ultra high density avian population comprising tens of millions of swiftlets. Such a man made shelter may be structurally configured into a roosting habitat 17 comprising I-beams 80 and 98, a lattice work of galvanized channels in the form of C, U, I, H and V shapes may be used in securing individual pieces of panels 69a assembled to form the main nesting panels 69; industrial hoists (81, 82, 86, 87, 88, 89, 90, 91) and supporting struts 83 forming the internals.

This internal structure may be surrounded by man made "cave" walls constructed from rocks and stones, clay and concrete comprising the external structure. The lower portion of the wall may comprise large blocks of rocks 101 bound together with stainless steel (SS 316) wires 103 and concrete, resting against a reinforced concrete wall 104. The upper portion of the wall may be constructed of smaller stones 102 bound with SS 316 wires and concrete. Alternatively the cave walls may be constructed from commercially available rectangular pieces of bricks cemented together with mortar and concrete. Blocks of bricks as disclosed in FIG. 3D above may also be used as building components to construct the walls and incorporated into the structure. While the fully covered roof 97 may be constructed from solid concrete and galvanized steel sheets secured to girders 105. The outer covering of stone walls may be constructed with water retaining features and soil medium 109 to support vegetative growth 111 covering the whole avian habitat 17 and breeding structure in natural greenery and providing a cooling internal environment.

The caves system may be partitioned and segregated into sections internally by walls for the purpose of cave management. Passages and access ways may be incorporated into the internal walls to enable passage of wind and birds. Such a method effectively isolates completed caves ready for occupation by swiftlets from new extension and construction works. It also makes possible the isolation of whole sections of the partitioned caves for disease control purposes such as the fumigation of pests like ticks and lice. The cave may measure 200 meters high and 300 meters wide at the base in cross-section. Lengthwise, the cave system may be scalable with new extensions being continuously added to accommodate avian demographic growth, theoretically estimated at a rate of 300 percent per year.

Skylight 107 provides natural light for the habitat 17 while lamp 103 may be specially configured to produce red wavelength of 620 nm to 730 nm as disclosed in U.S. Pat. No. 6,766,767 by El Halawani to increase the reproductive rates of poultry. Such a method may be tested out and if found suitable, acquired for use in enhancing the reproductive rates, eggs laying and nesting activities of tens of millions of swiftlets in producing large amounts and huge quantities comprising tons of edible bird's nests each nesting season (under licensing agreement). Light is of no importance to swiftlets for flights in caves as they rely on a highly developed bio-sonar system and echo-location techniques to navigate in total darkness.

All girders and structures may be designed to rest on rollers surrounded by laterally mounted springs to cushion and negate damages due to earth tremors. The footing of main panel 69 and securing galvanized C, U, I and H shaped channels may be encased in a concrete base 108. Numerous access ways 79 may be designed and built underneath the edge of roof 97 and stone wall 102 for swiftlets to enter and exit a wholly man made artificial cave structure 100, and to enable passage of air and circulation. Holes left in between the stones 101 and 102 used to build the cave wall also assist in air circulation.

FIG. 5F shows the bird's eye view of a wholly man made artificial cave structure 100 built for breeding swiftlets to produce edible bird's nests. The breeding and production facility may occupy a spread comprising 100 hectares with open land reserved for the future construction of additional breeding facility. The facility may be surrounded by a high walled structure 113 with guard towers 114 built on top of an elevated bund 112 ringed by a moat 24. Wall 113 may be protected by the predator traps arrangement as disclosed above and shown in FIG. 2G and FIG. 2H. Rain water retained in soil medium 109 supports vegetative growth 111 for plants such as creepers, lianas, rottan, etc. providing coverage and shade for the cave system, cooling and shrouding it in greenery. Bird's droppings and guano collected from cave floor may be used as fertilizer in the eco-farm to provide sustenance to shrubs and plants. Rail track 115 provides ease of transportation and goods carriage within the breeding cum nest production facility. Tower crane 116 installed on a moveable base may be installed to carry out the main construction work such that the crane may be shifted to one flank of the habitat for further expansion work due to the rapid growth in avian population (300% per year). Due to the height of structures measuring hundreds of meters, lightning arrestors 117 may be incorporated into the buildings such as the wholly man made artificial cave structure 100 and sentry towers 114. Lightning conductors 117 may also be installed independently around the whole facility to protect the eco-farm from lightning strikes. Wind-speed monitors and pressure sensors 118 may be installed on top of roofing 97 to detect and warn of wind directions, speeds and differential pressures build up which may cause potentially disastrous wind-lev. effects to the roofing structures 97 and 105.

All roosting structures and nesting habitats should be designed to be well ventilated, well drained, dry, cool and humid in the hot tropical weather. Well ventilated structures with natural drafts may be assisted with motorized fans to induce artificial drafts during windless days. Cooling internal temperatures may be maintained at 25 to 30 degrees Centigrade in a dry environment, and maintained with appropriate heating and air conditioning systems. Brightness and humidity (90%) should be emulative of the natural cave environment. Humidity should be controlled with appropriate humidifiers to maintain the high humidity of about 90%. All artificial roosting structures should have foot holds and grips 59, 60 built for swiftlets to perch vertically. Ledges 57 may be cut into cliff-face 16 and caves 18 dug while hollow bricks, nesting panels and crevices should be made with rough and serrated internal surfaces 59, 60 for providing footholds for swiftlets to cling securely onto vertical surfaces, such that the cliff face and caves may be chopped with an axe. The structures should be designed to maximize vertical surface area for swiftlets to cling to and built their nests. Rough screed surfaces such as pock marks, small holes and raises, indentations 59, protrusions 60 and groves 57 may be included in the design of all nesting structures to maximize vertical gripping and clinging surfaces for the swiftlets and juveniles. Perforations 72 and 58 may provide ease of passage for wind and birds. The top of the structure may be partially covered and the habitat mounted on top of an earthen hill or mound.

The nesting habitat, swiftlets breeding and edible bird's nests production facility may comprise of a combination of: a wholly man made artificial caves structure 100, converted natural caves 77, modified natural cliffs 16, man made roosting structures 15, 54, 63 to 68, including purposely abandoned human dwellings 11; and buildings 14 purposely left vacant; or similar man made structures specially built to attract and provide swiftlets with a safe and sheltered breeding and nesting site.

External wall and fencing 23, high walled structure 113 and guard towers 114, predator traps, enveloping cage 22, moat 24, solid roof structure 97 and 105, a wholly man made artificial cave structure 100 and security arrangements as disclosed in present invention protects the swiftlets from natural enemies comprising airborne predators and birds of prey such as owls, hawks, eagles, raptors, peregrines, bats (attacks chicks) etc; terrestrial predators and wild animals such as squirrels, wild cats, civet cats, mongooses, monkeys, snakes, lizards, large carnivorous crickets (attacks chicks), etc.; and prevents the roosting habitat from infestation by natural pests such as mice, small rodents, soldier ants, cockroaches, ticks and lice, etc. allowing extermination of such vermin with ease.

During non-breeding seasons in day time, after all the swiftlets had gone feeding, individual sections of the caves system 100 or 77 which are partitioned and segregated from the rest of habitat 17 by internal walls may be closed off and isolated for fumigation. All passages and access ways 79 leading to the cavity may be closed to prevent birds from entering. Liquefied chlorine (Cl2) stored in 1 ton drums may be vaporized and piped via SS-316 or PVC tubing to the roof structure 97 and 105, and released from the roof-top to fill the cavity with a concentration of 5 ppm to 10 ppm of chlorine.

The chlorine gas may be held in the cavity and allowed to "soak" for a few hours. Then all access ways 79 and trap doors 110 are opened to purge the cave cavity. During the soak period, the chlorine gas concentration may be maintained by top-up releases. Standard personal protective equipment such as chlorine gas masks with heavy duty filters and self-contained breathing apparatus may be worn to protect personnel. The cleansed cavity may remain closed to swiftlets for a few days for the pungent smell to clear before being re-opened for habitation. Or, large industrial fans with blades 4 to 5 meters in diameter may be used to provide forced draught to purge the fumigated cavity of chlorine gas. Such a mobile fan mounted on wheels may be brought to site by rail 115, and forced draught channeled into the cave cavity by means of air ducts. Such a fumigation operation may be carried out at regular intervals to exterminate ticks and lice. The short coming being that, though living ticks may be wiped out by chlorine gas, eggs may still remain viable to hatch later on. Besides liquid chlorine gas supplied in drums and cylinders, powders or liquid solutions of sodium hypochlorite (NaOCl) or calcium hypochlorite (Ca[OCl]2) may also be used to produce chlorine gas for fumigation. Other industrial gases such as hydrogen sulphide and carbon monoxide may also be used.

Alternatively nesting panels 69 may also be cleaned with high pressure water jets produced by hydro-jetting machines to remove ticks, lice as well as their eggs, which may be laid in minute crevices and niches, such that only a high pressure water jet may dislodge and flush them out. Cleaners carrying hydro jetting nozzles attached to high pressure water hoses may access the nesting panels 69 using hoists and work cages 82. Cleaning works should commence from the uppermost level of the panel hundreds of meters above, gradually working down to the ground level. Water jets also helps to clear and clean the nesting panels 69 of edible bird's nest impurities such as bird shit and feathers. A clean nesting panel produces clean and very high quality edible bird's nests.

Such pest control measures may help to address and rectify habitat-population constraints posed by lethal pressures from ticks. Odorless and bio-degradable insecticides may also be used to exterminate the ticks. Poison baits may also be used for exterminating mice, rats, cockroaches etc. Sulphur pellets may be scattered around the perimeter of 17 to deter snakes.

Ample signage may be placed at the farm periphery providing warning to human intruders. The perimeter wall and fence 23 may be protected and reinforced with multiple layers or a grid of extremely high voltage electrical wiring (e.g. 2 to 10 kilovolts) configured to deter larger intruders or predators such as wild buffalos, tigers, bears, etc. Electricity from normal 220 volts supply may be stepped up by means of transformers to 415 volts or thousands of volts as desired to repulse unwanted intruders. Such powerful deterrence also guards against incursions by thieves and poachers. Alternatively, a high surrounding solid wall 113 complete with watch towers 114 may be erected in place of the perimeter wall cum fence 23.

Armed guards may patrol the edible bird's nests production facility to keep out human predators such as poachers, nest robbers and thieves with additional guards and patrols deployed during the nesting seasons, collection and delivery of edible nests. Communications may be maintained by means of radio transmitters and instant messaging using multi-media mobile personal gadgets. Closed circuit televisions and web-cams monitoring the site may be viewed at a local control centre and external links with a centralized monitoring center by means of modern satellite and land based telecommunications network and the Internet. Backup resources on hot standby may be instantly deployable in response to detected human threats.

Such safety and security risks mitigating measures may be used to reduce avian mortality and improve survival rates of the birds to enhance farm population. Consequently, a greater quantity of nests can be produced for collection leading to improved productivity of the eco-farm. Comparative to conditions in the wild in which swiftlets are subject to the vagaries of nature such as scarcity of food and high mortality rates due to predation of adult birds and chicks; secure avian farms enhances conditions for the nesting, breeding and rearing of swiftlets thereby increasing productivity of the edible bird's nests production facility. Favorable conditions that only a farm environment can provide. Birds may be kept in the gigantic enclosed aviary 22 (100,000 cubic meters, or a million cubic meters in volumetric capacity and flight space) blended into the natural environment and setting with a plentiful supply of nutrients.

When nesting season approaches, adult swiftlets may select suitable sites to build new nests in which to lay eggs and raise the young such as crevices 18 or on any part of the vertical nesting habitat. During the breeding season, each pair of little birds can produce a full nest of saliva the weight of their own body in 45 days. The saliva is produced from a pair of sublingual glands located beneath the tongue of the birds. Ducts from the glands open into the floor of the mouth. Both the male and female birds have a pair of these glands and contribute towards nest building during the breeding season. Nests built of sticky saliva comprises of a gelatinous substance.

Normally a clutch of 2 eggs are laid in the nests of domesticated birds which may be partially removed and collected for hatching in incubator 30 at site. Eggs remaining in the nests may be naturally hatched and the young brought up by the parent swiftlets. Such a step relieves parent birds of the need in providing food for all the chicks upon hatching, enabling more food to be made available and provided to a smaller number of chicks. Minimizing stunted growth or death due to starvation improves the survival rates of chicks.

In an extension of the captive breeding program, eggs collected from the nests of the domesticated birds at the farm may in turn be brought to another location for hatching by means of incubators and hatcheries 30 in newly established eco-farms similar to the parent facility. Likewise, swiftlets chicks in nest or clinging on to the walls and main nesting panels 69 of habitat 17 may be collected and brought to green house 33 for acclimatization. Or, relocated to another location to populate a newly constructed swiftlets breeding facility for producing edible bird's nest, and to establish a new colony of swiftlets at site.

In another embodiment of present invention, upon hatching from the incubators 30, young chicks are moved to the captive breeding section equivalent to an "avian training school" 33 where young birds may be kept in a controlled green-house environment where the temperature, humidity, ventilation, etc are controlled. Hatchlings may be hand fed a concoction of semi-solid food comprising porridge or gruel of rice, tapioca or sago flour mixed with ground fish, meat, sago worms, vitamins, minerals, fortifying medications and nutrients by the handlers. A broth made from ground flour of other seed grains and staples like maize, barley, wheat, etc. may also be used. Pipettes and syringes may be used as feeding utensils to nurse the chicks up to 8 times a day. Worms from the wormery may be provided as the chicks opens their eyes and grow larger. Pelletized feed may be given such that young chicks (of chicken) pecking at worms and feed pellets may be used to physically demonstrate and impart the appropriate feeding skills to the swiftlet chicks. Swiftlets chicks may likely follow such demonstrative teachings and example on the part of the young chicks (of chicken). The greenhouse 33 may be designed to resemble the natural cave habitat where they are fed, cared for and brought up by their human handlers manually to create a bonding, recognition, taming and attachment to its colonial roosting habitat and "masters." This may be similar to rearing of house-hold pets such as cats and dogs; domesticated farm animals such as horses, cattle and sheep; or domestic fowls such as chicken and ducks; such that the animals recognizes their human handlers and masters.

When juvenile chicks started learning to fly, the young birds may be quarantined and their wings clipped temporarily to restrain and prevent full flight until they had grown larger and stronger. Such that young juvenile birds may still be able to fly at low heights and short distances. At this stage, both the artificially hatched and naturally (parent) hatched chicks collected from nesting habitat 17 may be reared together in the green-house enclosure 33 for pre-mediated conditioning, training and acclimatization so that they can learn to recognize their human handlers and adapt to the "home" environment. As juvenile bird(s) represents easy prey for their natural predators and bullying by adult birds other than parents, chicks may be raised and kept in the green-house enclosures 33 for a certain period of time (e.g. two months) until they have grown larger before being transferred into a fully enclosed transitional facility 28 forming part of the nesting habitat 17 with wire netting spaced 1×1 cm apart. This ensures bonding of the fledglings to the colony from the moment they are born. Juvenile birds may be kept caged for another 6 months in the transitional facility 28 before being transferred into the adult bird's nesting habitat 17 to follow adult birds to search for natural food in the vicinity 39 of the avian farm. The fully enclosed roosting habitat 17 may be designed and configured to nest hundreds of thousands of swiftlets.

Musical, optical effects and human touch may be employed and used for conditioning and acclimatization of fledglings to handlers and masters and to create a sense of belonging. Training may also include a pre-arranged audible signal such as the sound of a whistle, bell, an audio based stimulus for the purpose of feeding, return to roost, etc. And to inculcate a positive response subject to such a stimulus by means of a "stimuli-response-reward" mechanism, such that responding birds are amply rewarded with large succulent sago worms. Such that a response to such an external man made stimuli becomes automatically ingrained into the brains and minds of the birds by accustoming them to said stimuli from young. Such habitual response being akin to reflex actions; behavioral based actions; a daily practice; a custom; rites of passage; a ritual pattern inculcated by means of training, conditioning and indoctrination from birth.

In another embodiment, juvenile birds may be trained in evasive techniques, reflex actions and survival skills by means of audio-visual and real-life practical lessons. In one form, cages of juvenile birds may be placed next to live predators, such that they may develop an intuitive capacity for the identification and cognizance of predatorial threats while young. In another form, cages with an enveloping external cover of finer mesh (1 cm×1 cm gaps) comprising 2 internal sections separated by a grill (4 cm×12 cm gaps) may be used for more advanced training. Small "escape cages" 37 with (4×12 cm gaps) grills may also be placed in the large cage. Juvenile birds are released into one side. A small fully covered cage containing birds of prey kept hidden in one corner of the facility may be suddenly opened to release the predators into the enclosure. Scaring and frightening the juvenile birds, causing a flight of survival into the adjacent section by going through the grills. Likewise, birds may escape by hiding in the small yellow "escape cages." Such live exercises and training may be used to teach juvenile birds to recognize the safety of home, which is the "safe-haven" of the colony.

Alternatively, a single enclosure may be used for training with numerous small cages painted in yellow placed inside. To escape from the predators, all the birds need to hide inside the "escape cages." Replica escape cages 37 resembling those used in training may be placed at strategic locations in the vicinity surrounding the avian farm in a pre-arranged step for creating a mini safe-haven such that in times of danger, or while being chased by a predator, birds may escape by hiding inside the cages 37.

In an alternative arrangement, fully domesticated juvenile birds may be released to seek natural foods upon maturing, reaching an age of six months to nine months (dependent upon growth rates which varies from one farm or area to another), or reached a stage when they can reasonably fend for themselves, having been properly trained in survival techniques as disclosed. The enclosure comprising transitional facility 28 may be opened as disclosed in FIG. 2J to allow parent birds to lead their grown off-springs to forage for natural food outside of the enclosure. Such that upon release juvenile birds returns to its avian colony and nesting habitat at dusk.

Referring to FIG. 2J detailed disclosure of the operational arrangement shall be described herein. The whole structure 22 may be made of fine mesh with 1½×1½ cm gaps. The access ways 49 of the enclosure 22 comprising grills 50 spaced with gaps 4×12 cm apart may be kept open during the day and fully shut at night to keep the birds inside by means of a sliding frame work 52 containing fine mesh 51 spaced 1½×1½ cm apart. Mesh 50 may be spaced 6×15 cm apart. Such a mechanism enables speedy quarantine, treatment of injured birds, administration of medication, growth hormone, reproductive hormone, inoculation against avian diseases, veterinary health checks to be carried out, etc. To enter or exit, swiftlets may fly straight through the horizontal slots in the access way, or fly to the vertical slots of metal grills 50, perch vertically by grasping the grills with their claws. Squeeze and turn their bodies through the slot or aperture 49 before flying to the nesting structure or feeding ground. The wire mesh of access way 49 may be designed just large enough to allow adult swiftlets to pass through, yet too small to allow the entry of larger predators, airborne or terrestrial. The configuration of the cage grill spacing may be varied to cater for different species of swiftlets: *A. fuciphagus* is 9 cm long and weighs 15 to 18 grams; *A unicolor* is 12 cm long; *A. maximus* has a wingspan of 13 cm and weighs 28 grams.

In an alternative arrangement, the whole enclosure comprising roosting habitat 17 (except 28) for adult birds may be constructed of wire mesh or grills spaced 4×12 cm apart such that swiftlets may enter and exit freely at will from any part of the protective cage structure 22 while airborne predators are kept out of the nesting habitat.

In U.S. Pat. Nos. 5,759,224 and 6,001,146 Olivier et. al. teaches a device and method for the continuous treatment of waste by means of fly larvae. Such a waste treatment method and device may also be used to raise larvae and worms to provide bird feed, and may be acquired under license if necessary. In present invention fly larvae are bred for the purpose of providing bird feed.

Figure 6A:
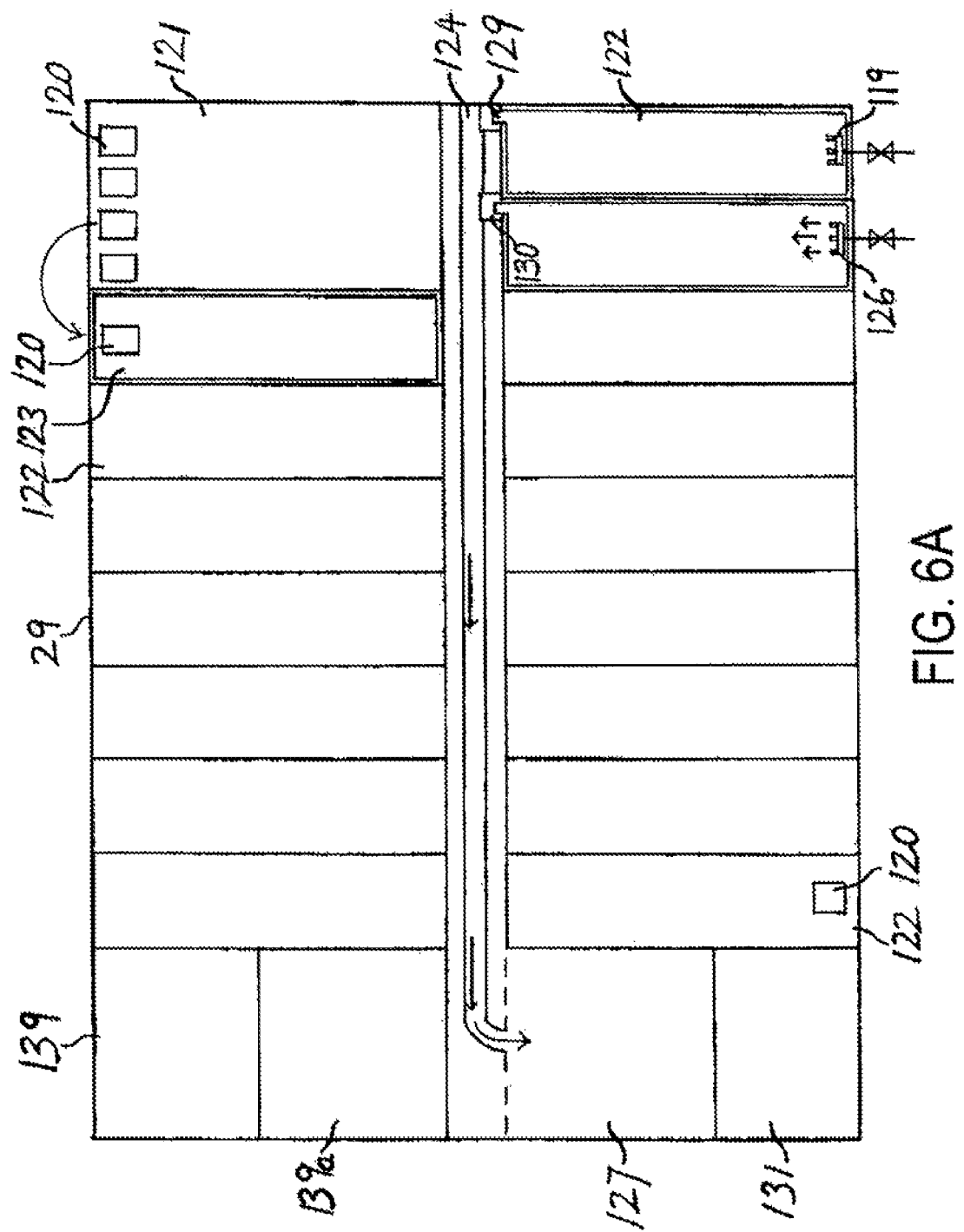
FIG. 6A shows the detailed layout plan of a worm production facility for providing swiftlets and fledglings with bird feed.

FIG. 6A shows the detailed layout plan of a specialized facility and apparatus 29 configured for breeding worms to provide a steady supply of food-grubs. Cultivated worms grown in the "wormery" may be supplied to the roosting habitat 17 and greenhouse 33 for feeding thousands of hatchlings and chicks. Fast growth type of worms such as maggots of the housefly *Musca domestica, Fannia canicularis, Stomoxys calcitrans, Calliphora* spp., *Lucilla* spp. or other insects may be bred in such a facility. Worm production facility 29 may be configured and constructed to produce hundreds of millions of worms for bird feed every day, especially during the nesting season. Parent bird(s) regurgitates the semi-digested food in its stomach to feed its chicks.

Adult flies are bred in compartment 121 to provide eggs for breeding larvae and worms. Each female house flies of the Genus *Musca* spp. such as *Musca domestica* can lay up to 500 eggs in batches of 100 eggs each. The eggs are white at about 1.2 mm in length. The larvae hatch from the eggs within one day and are pale whitish measuring 3-9 mm long, thin at the mouth end and without legs. Adult flies live from two weeks to one month. Other fly species which may also be bred in such a worm production facility 29 includes species similar to the *M. domestica* such as *Fannia canicularis, Stomoxys calcitrans, Calliphora* spp. and *Lucilla* spp. The lesser housefly *F. canicularis*, is smaller and more slender than *M. domestica* while the stable fly *S. calcitrans*, looks similar to *M. domestica* but has a longer piercing mouth part used to penetrate the skin of humans and animals in order to suck blood.

Figure 6B:
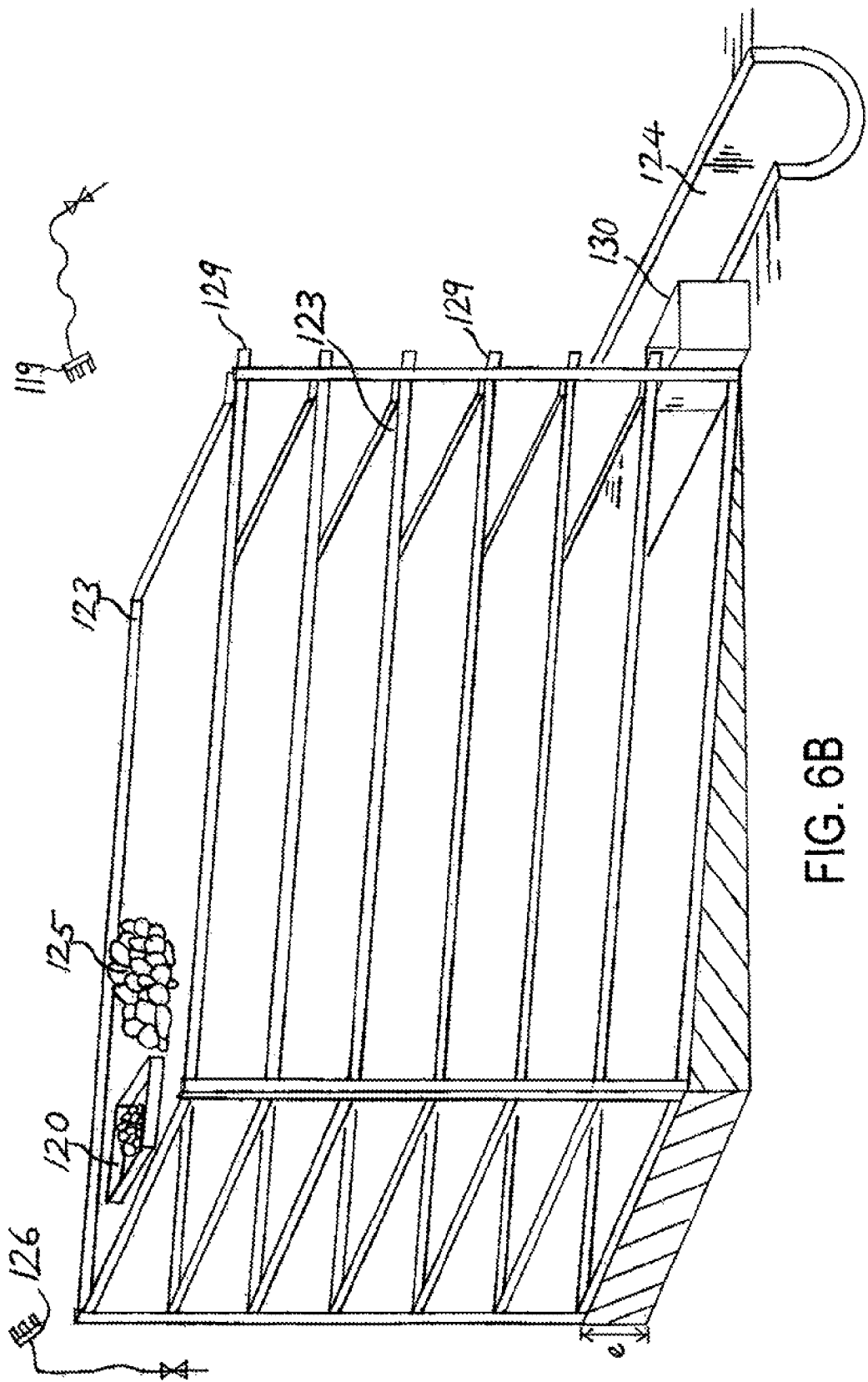
FIG. 6B shows details of an array of inclined breeding trays of FIG. 6A for incubating and breeding worms.

Small trays 120 containing organic feed materials are put in egg laying compartment 121 for adult flies to deposit their eggs. After one day trays 120 maybe removed and placed into the numerous adjacent compartments 122 on breeding trays 123 for incubation, hatching and growing as shown in FIG. 6B. Kept in the warm tropical environment larvae (maggots) hatches from the eggs within one day. Tray 123 may be mounted on an inclined sloping floor as indicated by 'e' slanted towards collection trench 124. Facility 29 maintains a high temperature and humidity in order to accelerate incubation and breeding rates. Galvanized zinc sheet roofing material may be used to provide a high daytime temperature of above 30 degrees C. Nozzle 119 provides water keep the humidity of the worms breeding facility high. Food for feeding worms may also be placed on wire mesh spacer 1 cm to 2 cm high on breeding trays 123.

The population of compartment 121 may be maintained by inbreeding of flies such that designated feed trays 120 placed in 121 may be kept permanently in the compartment. Adult flies feeds on the nutrients and laid eggs in the trays. Larvae hatches and in turn, fed on the nutrients. When the larvae mature, they pupate before transforming into flies. The floor and sides of compartment 121 may be kept dank and dark with a plentiful supply of cavities for larvae to pupate. Such cavities may be provided by means of man made honey combed lattice structures, or the hollow cavities provided by dried out bones of animals used to feed the flies may be used to provide a pupating habitat. Larvae upon crawling into such cavities, finds a conducive environment in which to form pupas, before metamorphosing to emerge as flies.

In compartment 122 feed stock comprising organic materials such as animal remains obtained from slaughter houses, abattoirs and fish markets, etc. may be used to provide nourishment to raise the maggots. Water may be provided by nozzles 119 in mist form sprinkled onto the trays to keep the moisture level high. After 3 to 4 days, grown worms in the array of inclined breeding trays 123 are ready for harvesting before the end of the 3rd instar or the pupae stage.

A manual harvesting method may be used in which the netting containing feed materials may be held up using a pair of thongs and tapped to shake off the worms. Worms may also be separated from the feed materials and physically dislodged by means of soft bristle brushes and brooms. The dislodged larvae may then be manually swept by brushes into a collection bin 130 placed beneath discharge point 129 at the end of the array of trays 123. Alternatively, jets of pressurized air discharged via nozzles 126 may be used to dislodge the worms from the feeding materials, pushed to the discharge point 129 and into bin 130 to be packed off to habitat 17 or green house 33 as bird feed. Upon being touched by hand or air, fly larvae instinctively curled up into a round ball and thus easily rolled around. On a dry smooth surface a good blow with our mouth may roll the spherically shaped larvae a distance of one meter. Air jets may be used to propel and push dislodged worms out of the discharge point 129 into collection bin 130. Collection bin 130 may be manually brought to apparatus 127 and its content poured into sieve tray 127 for cleaning and separation. Worms spilled outside of bin 130 may be swept by brooms via trench 124 into apparatus 127 or they may be air blown by nozzle 126 into apparatus 127.

Alternatively, all of the larvae and worms may be dislodged by air, flushed and swept into trench 124 where a cushion of air provided by another nozzle 126 may be used to provide propulsive force to flush the spherically shaped larvae into apparatus 127. A water flush provided by nozzle 119 may also be used in place of compressed air, but water makes the round balls of worms sticky and worms may drown if left for too long in water. Live worms being the preferred feed material for swiftlets, compressed air is a more suitable harvesting medium. Waste feed material and residue left behind on breeding trays 123 such as bones, feathers, hair, skin, etc. may be manually removed by means of brooms, brushes and pans for disposal.

Figure 6C:
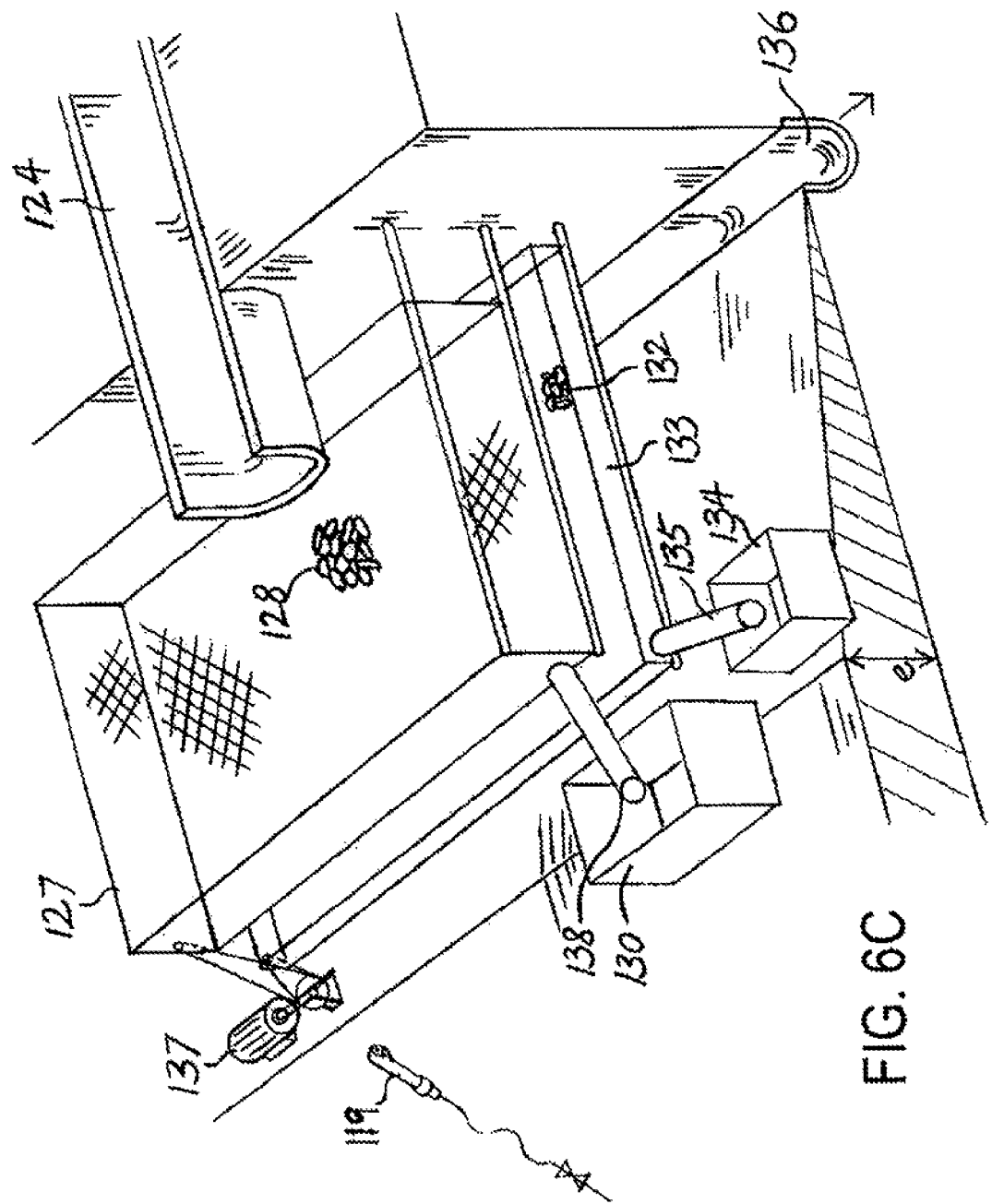
FIG. 6C shows a sieve apparatus for segregating grown worms for bird feed and smaller worms for further growth or fattening.

FIG. 6C shows a worms processing apparatus 127 for separating grown worms into feed-stock and small worms to be returned to tray 123 for further growth. The worms may be poured from collection bins 130 into sieve tray 127. Or they may be propelled by a cushion of compressed air via trench 124 into a vibrating slanted sieve tray 127 comprising mesh size 2 mm×2 mm where larger worms 128 may be filtered and channeled into collection bin 130 via funnel 138. The mesh of tray 127 may be slightly inclined towards discharge funnel 138. Water provided by nozzle 119 may be sprayed onto tray 127 to wash and clean the worms while vibratory movement of the tray 127 provided by vibrator motor 137 separates them. Vibratory movement of the tray 127 causes the worms to curl up forming spherical round balls. Thus they rolled around and are easily separated from pieces of wet feed materials carried over from breeding trays 123 which tends to stick and cling to the wire mesh of tray 127 and easily removed by brush manually. Vibratory movement combined with the inclination of tray 127 causes the spherically shaped worms to move automatically towards discharge funnel 138 and into collection bin 130. In compartment 131 grown worms are poured into trays with fine mosquito netting and blown dry by fans. Wet worms may cause diarrhea to hatchlings. After drying, it is packed out to the habitat 17 and green house 33 as bird feed.

Small sized worm 132 passes through sieve 127 and are collected into another vibrating slanted sieve tray 133 placed beneath tray 127. Tray 133 comprises fine mesh size 0.5 mm×0.5 mm separating washing water from the maggots 132 which are filtered and channeled into collection bin 134 by means of funnel 135. Small worms 132 are brought back to the compartment 122 and placed in breeding trays 123 for further growth. The whole apparatus is mounted on a sloping surface 'e' such that washing water from nozzle 119 may be drained from the inclination into drainage system 136. Mechanical movement for vibration of sieve trays 127 and 133 may be provided by a motor 137. Alternatively, all worms collected from trays 123 or collection trench 124 may be directly packed into feeding bins 130, washed with water from nozzle 119 and sent to habitat 17 as bird feed. Bin 130 has a porous bottom to drain off remnant water.

Larvae of beetles of the *Rhynchophorus* spp. locally known as sago worms which can grow to the size of the human thumb, provides nourishing food during the nesting season and for parent birds to feed their young. Sago palms of the genus *Metroxylon* spp. a plant native to Borneo and cultivated in large estates in the Malaysian state of Sarawak, may be obtained as feedstock for the large scale production of sago worms which may be used as food-grubs to feed nesting swiftlets, and in turn, chicks at the avian farm as parent bird(s) regurgitates the semi-digested food in its stomach to feed its young. Mature palm trees are cut down and left to rot at log pond 32. Sago beetles comprising *Rhynchophorus* spp., common in the tropics and native to the island of Borneo deposits their eggs in the rotting trunk of sago logs. The eggs hatches and larvae feeds on the pith or pulp of the trunk. Fully metamorphosed beetles emerge from the pupae in about two month's time. Sago palm of the genus *Metroxylon* spp. comprises the species *M. sagus, M. rumphii, M. sylvestre, M. longispinum*, etc. Beetles of the genus *Rhynchophorus* spp. comprises of the species *R. ferrugineus, R. palamrum, R. phoenicis, R. vulneratus, R. bilineatus*, etc.

The taxonomy of these sago beetles is as follow: Phylum: Arthropoda; Sub-phylum: Uniramia; Class: Insecta; Order: Coleoptera; Family: Curculionidae; Sub-family: Rhynchophorinae; Genus: *Rhynchophorus*; Tribe: Rhynchophorini. Beetles comprising other genera of the Coleoptera Curculionidae order or family may also be captured and bred for their larvae such as *Oxyctes* spp., *Scapanes* spp., *Metamasius* spp., *Dynamis* spp., *Rhabdoscleus* spp., *Paramasius* spp., etc. with a compatible supply of food, nutrients and breeding environment specific to their needs.

Adult beetles may be captured by means of normal insect traps for breeding in compartment 139. They may also be lured into feed traps by means of a mixture of decaying fruits comprising sugar cane, pineapples, bananas etc; moist fermented palm tree tissues comprising stems, leaves and palm fruits. The trapped beetles may be bred and reared in captivity for laying eggs. Beetles derived from the eggs may also be raised in compartment 139 for maintaining a breeding colony. The captive bred beetle colony may be fed a diet of decaying fruits comprising sugar cane, pineapples, bananas, coconuts and fermenting palm tree tissues comprising stems, leaves and palm fruits. During feeding males beetles releases pheromones comprising Rhynchopherol or Ferrugineol. Wild beetles responding to this olfactorial attraction or stimulant of pheromones and food may be attracted to the vicinity of the captive colony. They may be manually captured to inject fresh breeding stock for compartment 139. Large chunks of sago trunk measuring 1 meter (length)×0.5 meter (thick) may be cut from the middle of the trunks and brought into eggs laying compartment 139 for adult beetles to deposit their eggs. Female beetles oviposit 30 to 400 eggs at a time. After a week, these pieces of cut sago trunks are brought back to the log pond and slid back into the original tree trunks. The beetle eggs hatches and larvae fed on the pulp. To check on the stage of larvae growth, size and estimated number of worms, the collector may put his ear close to the sago tree trunk. He will hear the crunching sound of the larvae devouring and feeding on sago pulp. A pair of stethoscope hooked to the experienced ears of a harvestor may work wonders.

Such a method for producing sago worms may be preplanned and staggered to produce a steady supply of bird feed throughout the breeding season. In the holding ponds 32, sago logs may be stacked neatly on metal racks for ease of administrative and management purposes. The sago logs or the compartment of the rack in which the logs are stored may be marked with details regarding the source of logs, type, date of felling, date of oviposition of eggs, harvesting date range, etc. such that harvesting time may be forecast, planned and ascertained. Sago logs may be physically moved around the ponds by means of hoists and winches, heavy duty forklifts and mechanized grippers commonly used in the timber logging industry; and cut into size with sawing machines before being seeded and deposited with beetle eggs. Specialized mechanized hydraulic wedges may be configured or acquired for use in splitting open larvae infested logs in order to harvest the worms.

Commonly known as red palm weevil, *Rhynchophorus* spp. attacks or are attracted to several species of plant: such as date palm, oil palm, sago palm, coconut palm, palemera palm, banana, pineapple, sugarcane; *Arenga, Coelcoccus, Corypha, Elaeis, Livistona, Matroxylon, Nypa, Oncosperma, Aloes*, and the screw-pine (Najeeb 1988, Jaffe et al. 1993). Traditional trap crops comprising coconut, pineapple, banana and sugar cane have been used for attracting, trapping and exterminating most beetles of the *Rhynchophorus* spp. Sugarcane is one of the cheapest and best sources of kairomones to enhance attraction of palm weevils to pheromone-baited traps. Adult *R. ferrugineus* and *R. volneratus* beetles are attracted to wounded palms where eggs are laid and the larvae tunnel into the terminal bud or trunk of the tree, leading directly to its death (Sadakathulla 1991). The sub family Rhynchophorinae contains several genera that are closely associated with Palmae, Zingiberaceae, Muscaceae, Amaryllidaceae and Gramineae, all monocotyledons (Kalshoven, L. G. E. 1981).

Before the beetle larvae reaches the pupation stage, the trunk is split open to collect large juicy worms providing a rich source of protein and fat, and an extremely nourishing food for feeding nesting birds. After sifting, smaller worms may be brought back for fattening at compartment 139a by feeding on pieces of cut sago trunk. Alternatively, they may be reared for breeding purposes such that the larvae are allowed to pupate, metamorphose and grow into adult beetles for laying eggs. Sago beetles or worms may also be commercially raised for producing animal products such as chitin and chitosan, and for retail as food grubs for human consumption. Small worms may be sold for 10 cents while thumb sized specimen goes for 50 cents. The pith or pulp of the sago tree may be processed to provide pellet form of bird feed. Sago flour forms a staple food for local people while sago worms are treated as a mouth-watering delicacy by the native populace in Borneo. In New Guinea, sago grubs roasted, deep fried (aroma of chicken wings) or alive provides a nutritious source of protein to coastal Papuans, as well as a ceremonial food for the Asmat tribe. Other insects comprising the Class Insecta may also be bred for their larvae and worms with a compatible supply of food, nutrients and a breeding environment specific to their needs.

Sago palms are slow to grow, taking between 8 to 12 years to mature. A major palm oil producer, Malaysia had successfully reduced the gestation period of oil palm trees. Similar reduction of the gestation period by means of hybrid species of sago trees in studies conducted by researchers in the Malaysian state of Sarawak shall enable large scale commercial production of sago to provide a stable supply of raw materials for the food processing industries. And a plentiful supply of sago logs for breeding worms to feed swiftlets. Besides sago palm (*Metroxylon* spp.) cut tree trunks of aged and unproductive coconut trees (*Cocos nucifera*) and oil palms (*Elaeis guineensis, Attalea butyracea*) felled for replanting purposes may be acquired as feed stock for breeding of red palm weevil larvae. Other related plants such as date palm, oil palm, sago palm, coconut palm, palemera palm, banana, pineapple, sugarcane; *Arenga, Coelcoccus, Corypha, Elaeis, Livistona, Matroxylon, Nypa, Oncosperma, Aloes*, and the screw-pine may also be obtained for use as feed materials, including plants in the family Zingiberaceae, Muscaceae, Amaryllidaceae, Palmae and Gramineae.

Supplementary foods for captive breeding of swiftlets may include ground seed grains such as rice, maize and pellet forms of bird feed used for poultry farming stored at location 36. Such that swiftlets may be raised to feed on all forms and types of food available. Such versatility and adaptability being beneficial to the survival of the fittest and may prove indispensable in times of adversity.

Figure 7A:
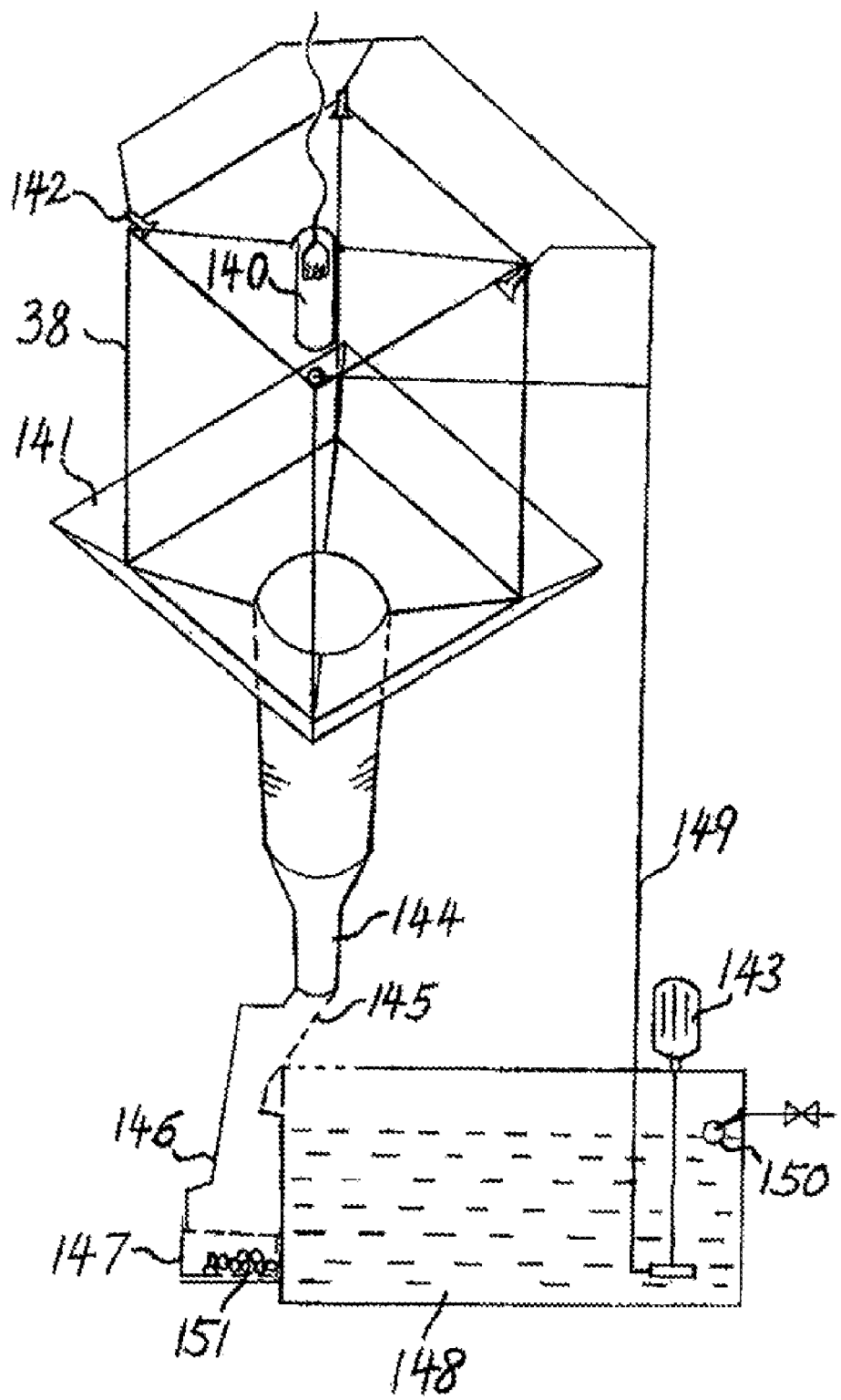
FIG. 7A shows an insects catching apparatus for provision of supplementary bird-feed.

FIG. 7A shows the detailed diagram of a specialized large scale insects catching device 38 for entrapment of airborne insects to provide adult birds with food. Insects comprises the primary food of these avian species. Insects are attracted by means of lights emitted by lamp 140 housed inside a water proof casing and reflective panels 141 into a large trap 38 constructed from wire mesh and mounted with water sprinklers 142. At regular intervals pump 143 automatically runs to spray water jets into the trap 38 by means of sprinklers 142 to knock down and wash collected insects into side collection panels 141, trough 144, sluice 145, guard panes 146 and retention bin 147. Water is diverted back into suction sump 148 from where it is circulated by pump 143 via piping system 149 to spray nozzles 142. Water level in the sump is controlled by float apparatus 150. Insects 151 gathered in retention bin 147 may be collected for bird feed. The apparatus may be configured wherein one unit may be stacked on top of another, such that several stackable units may be combined together to maximize insect catches. Commercially available chemical attractants such as pheromones, sexual stimulants, etc. may be used to attract insects and improve catches. Commercially available insect traps of suitable configurations may also be acquired and used for obtaining bird-feed.

A managed and sustainable harvesting of edible bird's nests may be carried out only after juvenile birds had left its nest and taken flight, or had been brought to training center 33. Three nesting seasons which varies from Jan to April and from August to December enables three collections or harvests to be carried out per year. The collector(s) harvesting nests which are attached to crevices, ledges, caves and structure of the nesting habitat performs a visual check to ensure that nests are actually empty and abandoned (i.e., that the edible bird's nest does not contain any eggs or young birds) before scraping the bird's nest receptacles from the structure to remove them.

Processing and sanitization treatment of raw harvested nests may be carried out by means of slight steaming. Raw nests are soaked and gently washed in cold water for 2 to 4 hours to soften the strands and manually scrubbed by hand to remove dirt, mud, bird shit. Dirty soaking water may be changed until it is clear and the nests strands had become soft and pliant. Larger pieces of feathers and other impurities may subsequently be removed, and gelatinous strands of the nests are moulded into an oval shape or in the shape of an actual bird's nests. De-feathering of edible bird's nests is a labor intensive task requiring plucking minute pieces of downs and feathers with forceps. At a temperature of 25 deg. C. and 60% humidity, the water content of nests may be kept at 12%.

Figure 7B:
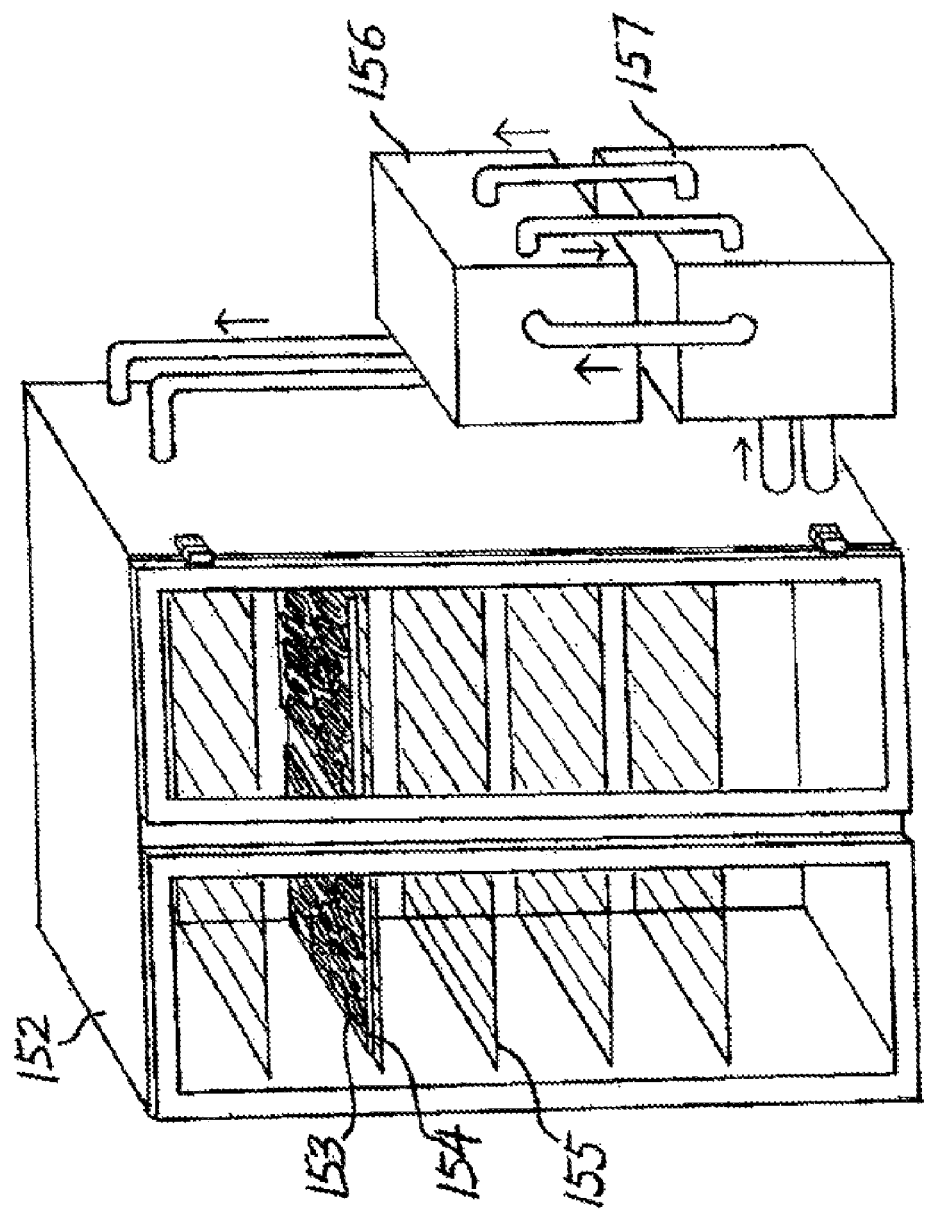
FIG. 7B shows an apparatus for drying wet edible bird's nests after it has been processed.

FIG. 7B shows a dryer-ventilator apparatus 152 for drying the processed nests. Wet nests 153 are placed on porous trays 154 for drying. Porous trays 154 may be placed on the grills of compartment 155 where cool dry air from the air conditioning unit 156 is passed over the trays. Exhaust air from the apparatus 152 may be recycled back to the condenser 157 of air conditioning unit 156 where it is cooled down, moisture removed, dried and re-circulated back into the apparatus 152.

Alternatively, on a large scale, the drying apparatus 152 may comprise a room with trays 154 placed on racks. The air conditioning unit 156 and condenser 157 may be run to dry out the wet nests stacked in the room. Pieces and strands of the nest sticks together upon drying. UV and IR lights and other sanitizing rays with fumigative and germicidal properties may be used to sterilize the finished products if desired.

FIG. 8A shows the plan view of a mechanized hoisting and winching apparatus used to harvest and collect edible bird's nests, while FIG. 8B shows a cross sectional view 8B-8B of the apparatus. The lifting apparatus comprises of two main components.

Firstly, the main mechanized lifting system comprising hoist drum 160 and rotary motor 161 to 165 provides vertical movement of cage 82 up and down cliff face 16. This mechanism is the main work horse which lifts the load comprising a work-cage 82, or a nest collector securely strapped in a safety harness. Electric motor 161 provides motive power which is transmitted via gearbox 162 to cable drum 160. Such a mechanism may be configured to lift a nest collector hundreds of meters up and down the steep cliff 16.

Secondly, a motorized mobile lever and pulley system 166 to 176 provides horizontal movement between point A and point B. FIG. 8C shows the detailed sectional view 8B-8B of the second component comprising the motorized lever and pulley mechanism mounted along the edge of cliff top 20, capable of moving a nest collector horizontally between point A and point B along the steep cliff face 16. Such a mechanism may be designed and configured to move a collector a distance of 50 to 100 meters from one part of the cliff to another (points A and B) enabling safe collection of edible bird's nests along this stretch of cliff face. Correspondingly the distance of cable 90 between the main lifting mechanism 160 to 165 and 166 to 176 may be adjusted and increased to maintain an optimum angle.

The fixed rail assembly 168 is securely anchored to cliff top 20 in a concrete base 175. On top of rail assembly 168 is mounted an anchoring roller assembly 167. Affixed on top of the anchoring roller assembly 167 is a motorized lever and pulley apparatus (171, 172, 166, 176). Propulsion is provided by electric motor 171 which moves a gear piece 172 against the gear teeth 173 of a fixed gear rail 174 affixed to a concrete base 175. Rollers and bearings 169 and 170 provides ease of movement as the motorized mobile lever and pulley system 166 to 176 is moved along cliff top 20 between point A and B.

Lifting cable or line 90 passes through the roller of pulley 176 residing on top of lever 166 to provide vertical movement.

Alternatively, the fixed rail assembly 168 and fixed gear rail 174 may be welded to girder 21 of the cage structure and the whole motorized lever and pulley mechanism 171, 166 and 176 may be mounted on top of the horizontal portion of the girder structure 21 resting on cliff top 20. In such an arrangement, girder structure 21 would require the construction of additional vertical legs and support resting on cliff top 20 to take the added weight. Refer FIG. 2I.

FIG. 8D shows a detailed view of a roller guide assembly comprising four rollers to keep the hoist cable or line 90 in position, to avoid and prevent damage due to abrasion against the housing assembly 163 as the mobile apparatus is moved between point A and B along the cliff top. One pair of vertical rollers 165 may be anchored to the drum line housing assembly 163. Another pair of horizontal rollers 164 may be secured to the vertical rollers 165 and kept in position by means of two pieces of positioning brackets 178. As the line 90 passes through the roller guide assembly, any one of the rollers coming in direct contact with line 90 will rotate to provide a smooth passage for the line while at the same time, keeping it in position.

Alternatively, main lifting mechanism 160 to 165 may be combined and integrated with the lever pulley mechanism 166 to 176 and mounted on a movable rail 168. Rail 168 may be modified to comprise dual tracked rails to take the load.

A number of such winching apparatus may be strategically positioned and spread on cliff top 20 to enable harvesting of nests along the whole stretch of cliff face 16 comprising the nesting habitat 17 and nest production facility. All of the components are securely anchored to the surface of cliff top 20. A safety cable or line 85 is anchored to a post 179 independently of the lifting apparatus for providing the collector with a backup, a last line of defense if the mechanized lifting system fails. For example, if lifting cable or line 90 broke suddenly then safety line 85 will be the collector's only insurance from certain death. Such that attachment to the safety line 85 may be made a mandatory requirement even before the winching apparatus can be started. Cable or line 85 is held in place by a piece of guide wire 180 diagonally attached to lever 166. Line 85 goes through the eye of the guide wire 180 freely such that it follows the main lifting apparatus and ensures that line 85 does not get entangled as the movable lifting apparatus moves between points A and B.

Figure 8E:
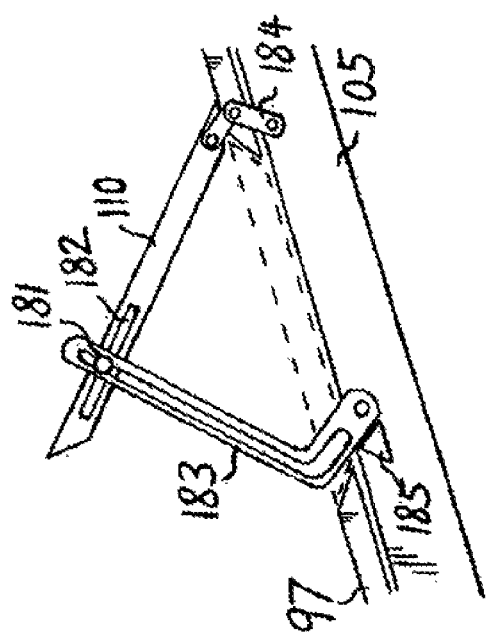
FIG. 8E illustrates further alternative features and arrangement of trap door 110, in which the self-activating trap door may be configured to open automatically by itself and to close back gently without slamming or banging.

FIG. 8E illustrates further alternative features and arrangement of trap door 110 to protect the roofing structure of breeding and production facility 100 from wind-lev damages. Self-activating door 110 may be configured to open by it-self and to close back gently by means of wind-lev. effects and gravity. The upper portion of door 110 is secured by flexible hinge joints 184 mounted on both sides of door 110. While the lower portion is moveable and kept in place by a double headed bolt or stud 181 and guide rails 182 and 183 mounted on both sides. As wind-lev pushes door 110 open, double headed bolt 181 mounted in rail 182 on both sides of door 110 guides it along a pair of external sliding guide rails 183 as it moves upward, opening a passage way in roof 97 for wind to enter and exit habitat 17. The maximum opening of door 110 is limited by guide rail 183 which is in turn limited by stopper 185.

When exterior wind speed drops adequately, trap door 110 experiences a reduced wind-lev effect and the weight of door 110 gradually make it drop lower until it closes. The guide rails 183 may be boomerang shaped such that as door 110 closes, its downward movement is stopped when it reaches the right angled bend. Thus preventing a slamming or banging effect from occurring. Door 110 pivots on swivel hinge 184 and guide rail 183 before seating back gently into its original position on roof 97.

Figure 8F:
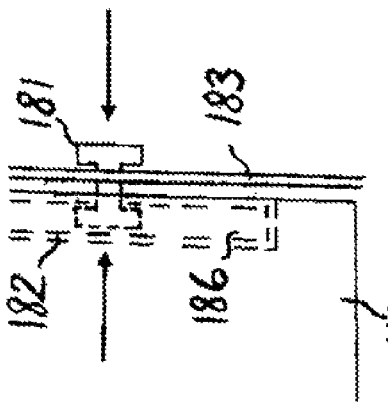
FIG. 8F shows a plan view and FIG. 8G shows section 8G-8G of the working mechanisms of FIG. 8E.
Figure 8G:
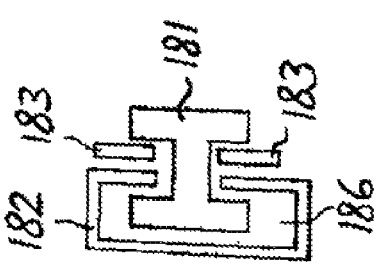

FIG. 8F shows a plan view of the mechanism while FIG. 8G shows section 8G-8G of the double headed bolt 181, one end of which is engaged in external guide rail 183 while the other end is engaged in door mounted 'C' shaped rail 182 and slot 186. The two ends of double headed bolt 181 being larger in size than the apertures of guide rails 182 and 183, slides in the channels 186 of door mounted guide rail 182 and external guide rail 183, holding the two pieces of equipment together as door 110 is moved, securing and preventing it from being blown off.

Figure 8H:
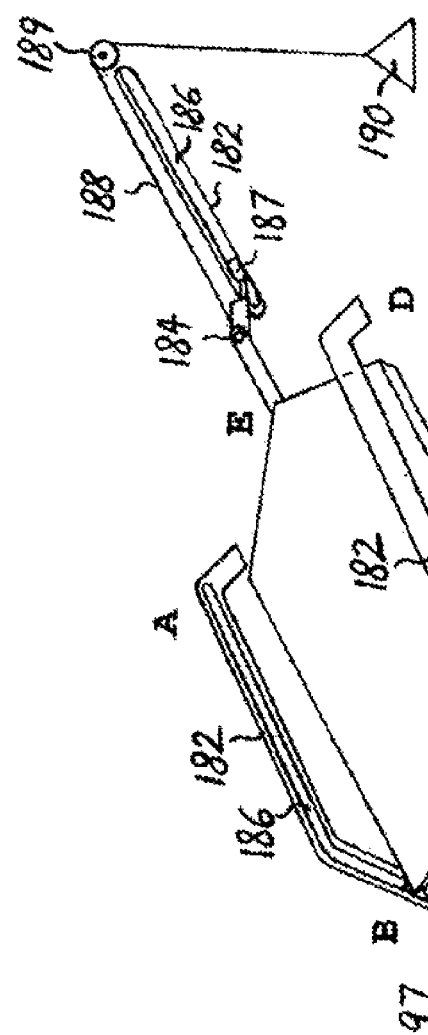
FIG. 8H shows an arrangement in which trap door 110 may be activated by wind-lev. and gravity assisted by a counterweight.

FIG. 8H shows an alternative arrangement in which trap door 110 may be designed to be self-activating, opening and closing automatically by means of wind-lev effects and gravity. Trap door 110 may be connected to counter-weight 190 by means of line 188 and pulley wheel 189. Weight 190 may be slightly lighter than the weight of door 110. Such that when a strong wind blows, creating a pressure differential high enough to push and lift up trap door 110, the weight of door 110 may now be supported by wind-lev. Counter-weight 190 easily overcomes this "lightened" load of door 110, and pulls door 110 open by means of line 188 and pulley wheel 189, sliding it up the roof incline. Allowing wind from the exterior of roof 97 to enter habitat 17 equalizing the interior wind speed and neutralizing the differential pressure cum wind lift effects.

Door 110 is guided in its movement by means of 3 pieces of guide rails 182. Anterior wise, two pieces of stud 187 may be affixed to the corners B and C of door 110, the other ends securely engaged in slot 186 of rails 182. Posterior wise, at point E, stud 187 may be affixed at one end to a swivel hinge 184, the other end engaged in recessed slot 186 of rail 182. When exterior wind speed drops adequately, trap door 110 experiences a reduced wind-lev effect and "regained" its body weight, gradually overcomes the pulling force exerted by counter-weight 190, slides down the roof incline until it seats back into its original position. Shapes of trap door 110 may comprise triangular or trapeze configurations such that exertion of wind-lev effects may be utilized more fully. Points ABCD having a larger surface area experiences a larger wind-lev effect than points AED. In another form, alternately spaced fixed overlapping inner and outer roofing structure may also be used to minimize wind-lev.

Standard practice in cleaning edible bird's nest is to swell the nest with a few changes of clear cold water. The swollen bird's nest is placed in a container and rinsed with water and the nest is broken apart by tearing the nest threads. Impurities such as particles and feathers are removed. Different nests have different properties, house nests produced in abandoned human dwellings, contains less impurities and feathers. They are cleaner and have an intact boat shape with a high swelling capacity. White nests are smooth while yellow and blood-red nests are crunchier because they contain more minerals than white nests.

Cave nests produced by wild swiftlets in natural caves and on cliffs are firm, hard and deep in color due to the harsh natural climate and environment. Cave nests are not as well shaped as house nests and contain higher impurities. Cave nests are crunchy with low swelling capacity that lengthens the time for preparation. Nests may be white in color, yellow, orange or blood-red. Shaped in the form of cups, lumpy, stripped, shredded, minced, ball shaped. The different products of bird's nests that can be found in the market include the natural whole nest, nest strips, nest pieces, nest threads and the irregular shaped nest cake processed from nest threads.

The age of the bird influences the quality of its nests. Generally the older the bird is, the more simmer-tolerant the nest. Bird's nests appears neat on the periphery, but are rough internally and high in elasticity with high culinary and medicinal value.

Nutritional effects-wise, edible bird's nest is widely known as a nourishing and replenishing medicinal food with special alleviative and therapeutic effects; a rejuvenating health food with restorative properties to reinvigorate the human body. Chinese researchers had discovered that edible bird's nest contains a "cell division inducing hormone" and an "epithelial growth factor" that can stimulate growth and division of cells, thereby enhancing tissue growth, cellular regeneration and cell-mediated immunity in humans. Such recent scientific evidence lends further proof to support the age old assumption and entrenched beliefs regarding such properties of edible bird's nest: such as stimulating regeneration of body cells; enhance cell-mediated immunity; rejuvenation and recovery of irradiated tissues, especially during medical procedures when patients are exposed to X-rays causing huge quantities of body cells to die off.

Composition wise modern scientific experiments have discovered that nests are largely composed of protein (49.9%), including considerable amounts of bio-active protein, as well as essential minerals such as phosphorus, iron, calcium, sodium and potassium. Studies have found that nests consist of elements which stimulate cell growth and reproduction, thus able to promote tissue growth, cell re-growth and enhance cellular immunity functions. Edible bird's nest contains the precious salivary secretion of swiftlets, thus the ideal storage method is to store the bird's nest in an airtight storage jar followed by refrigeration. Nests may be dried with a fan or beneath an air-conditioner. Care should be taken to avoid drying of nests by baking or exposure to direct sunlight.

The avian farm may engage specialist expertise such as ornithologists and veterinarians to study and monitor the swiftlet population growth rate, mortality rate, behavioral patterns, demographic dynamics, food resource, etc. for future planning needs. Such as expansion of the nesting habitat, demography and distribution of avian population, food supply logistics, forecast and planning, limitations of the feeding ground surrounding the farm, etc. All such data are non-existence and require further study and research to determine.

Included in the eco-farm are specialized avian treatment facilities such as veterinary laboratory for (swiftlet's) physiological sampling and checking, such as blood tests, inspection, avian disease control and testing; medication and administration of avian medicine, vaccination against disease and sickness; programs to increase growth rates and accelerate reproductive capacity by means of growth hormones, mating hormone or lights comprising special bands of red light comprising wavelengths 620 nm to 730 nm. In U.S. Pat. No. 6,766,767 El Halawani et al. teaches such a method of employing photostimulation to increase eggs production in poultry. In U.S. Pat. No. 4,828,987 Kopchick et al teaches a method of using bovin growth hormone to increase growth rates in poultry. In U.S. Pat. No. 5,151,511 Souza et al teaches a purified and isolated DNA sequence coding for expression of chicken growth hormone polypeptide. These methods may be trial-tested and if found suitable, adopted and applied under license to domesticated swiftlets to dramatically increase its population and the edible bird's nests production capacity of the farm. The farm may also include monitoring & quarantine facilities; fumigation and pest control equipment and facilities for ticks, mites, lice, etc.

The swiftlets breeding and edible bird's nests production facility may also be used to provide a scientific-research platform, a facility for carrying out experiments and studies in swiftlets related fields of specialties such as avian disease, preventive measures, etc. Ornithologists and research fellows may study avian and swiftlets colonial behavioral patterns under controlled conditions without scaring the birds. Or, in the specialized scientific research of the avian echo-location capabilities of these cave swiftlets. Minute radios with micro-transmitters may be attached to the swifts to monitor their pattern of flight, range and feeding habits, etc. under conditions that only a domesticated farm may provide.

Mechanical lifts used in high rise buildings may be used for transportation up and down steep cliffs, structures and the roof of bird caves 100, hundreds of meters high. Equipment for use at the farm may comprise lifting machineries such as man lifts, overhead cranes or hoists, tower-cranes together with specialized mountaineering cum sports equipment such as lanyards, hooks, tackles, foot grips, grapples, etc. for rappelling the steep cliffs of the production facility. Permanent hooks and tackles may be built and installed into strategic locations within the production facility. Ladders, securing ropes, attachment points, etc. may be pre-positioned together with safety lines, harnesses. Standard house-keeping practices, equipment maintenance, statutory inspections, standard operating procedures, work safety and production quality form the norms of such a breeding and production facility.

All of the features and individual components, apparatus and methodology as disclosed in present invention may be cross applied and used in combination and integrated with each other.

The invention claimed is:

1. A method of cultivating and harvesting edible bird's nests, said method comprising:
   providing a production facility comprising a man-made roosting and housing structure configured to provide an enclosed nesting habitat for breeding swiftlets for their nests in an environment emulative and simulative of natural cave conditions in which cave dwelling swiftlets thrives; said production facility comprising:
   a single-sided cliff having a roof structure supported by girders and containing a plurality of vertical nesting panels, the roof structure further containing a hoisting cage for collection of nests from the vertical nesting panel;
   providing means for maintaining the enclosure environment at a temperature range of about 25 degrees C. to 30 degrees C.; and humidity at about 90%; and
   providing means for attracting swiftlets to reside in said enclosure and roosting structure.

2. A method as recited in claim 1, wherein, said means for attracting swiftlets comprises at least one audio system for the broadcast of recorded play back of at least one swiftlet's bird call.

* * * * *